US009806979B1

(12) United States Patent
Felstaine et al.

(10) Patent No.: US 9,806,979 B1
(45) Date of Patent: Oct. 31, 2017

(54) SYSTEM, METHOD, AND COMPUTER PROGRAM FOR OPTIMIZING A CHAIN OF VIRTUAL NETWORK FUNCTIONS IN A NETWORK BASED ON NETWORK FUNCTION VIRTUALIZATION (NFV)

(71) Applicant: Amdocs Software Systems Limited, Dublin (IE)

(72) Inventors: Eyal Felstaine, Hertzeliya (IL); Ofer Hermoni, Yavne (IL); Nimrod Sandlerman, Ramat-Gan (IL)

(73) Assignees: Amdocs Software Systems Limited, Dublin (IE); Amdocs Development Limited, Limassol (CY)

( * ) Notice: Subject to any disclaimer, the term of this patent is extended or adjusted under 35 U.S.C. 154(b) by 424 days.

(21) Appl. No.: 14/572,728

(22) Filed: Dec. 16, 2014

Related U.S. Application Data

(60) Provisional application No. 61/918,597, filed on Dec. 19, 2013, provisional application No. 61/941,380, filed on Feb. 18, 2014, provisional application No. 61/981,116, filed on Apr. 17, 2014, provisional application No. 62/026,508, filed on Jul. 18, 2014, provisional application No. 62/026,512, filed on Jul. 18, 2014.

(51) Int. Cl.
*G06F 15/173* (2006.01)
*H04L 12/26* (2006.01)
*G06F 9/455* (2006.01)

(52) U.S. Cl.
CPC ......... *H04L 43/10* (2013.01); *G06F 9/45533* (2013.01)

(58) Field of Classification Search
CPC ............................ H04L 43/10; G06F 9/45533
See application file for complete search history.

(56) References Cited

U.S. PATENT DOCUMENTS

| 6,345,239 | B1 | 2/2002 | Bowman-Amuah |
| 6,427,132 | B1 | 7/2002 | Bowman-Amuah |
| 6,611,867 | B1 | 8/2003 | Bowman-Amuah |
| 6,629,081 | B1 | 9/2003 | Cornelius et al. |
| 6,983,037 | B2 | 1/2006 | Argo |

(Continued)

FOREIGN PATENT DOCUMENTS

| WO | 01/07170 A1 | 2/2001 |
| WO | 01/16849 A2 | 3/2001 |

(Continued)

*Primary Examiner* — Jonathan Bui
(74) *Attorney, Agent, or Firm* — Zilka-Kotab, PC

(57) ABSTRACT

According to one aspect of the present invention there is provided a system, method, and computer program product for deploying a plurality of virtual network function (VNF) instances in a communication network using network function virtualization (NFV-based network), where the network includes a plurality of computing-related units and communication links in-between, the method including: determining at least one performance value for at least one of the computing-related units and communication links, determining at least one performance requirement for at least one of the VNF instances, and associating the at least one VNF instance with at least one of the computing-related units and the communication links according to the at least one performance requirement and the at least one performance value.

9 Claims, 17 Drawing Sheets

(56) References Cited

U.S. PATENT DOCUMENTS

| | | |
|---|---|---|
| 7,069,234 B1 | 6/2006 | Cornelius et al. |
| 7,167,844 B1 | 1/2007 | Leong et al. |
| 7,610,233 B1 | 10/2009 | Leong et al. |
| 7,860,232 B2 | 12/2010 | Huang |
| 8,023,425 B2 | 9/2011 | Raleigh |
| 8,023,494 B2 | 9/2011 | Takeda |
| 8,166,176 B2 | 4/2012 | Kumar et al. |
| 8,229,812 B2 | 7/2012 | Raleigh |
| 8,250,207 B2 | 8/2012 | Raleigh |
| 8,270,310 B2 | 9/2012 | Raleigh |
| 8,270,952 B2 | 9/2012 | Raleigh |
| 8,321,526 B2 | 11/2012 | Raleigh |
| 8,326,958 B1 | 12/2012 | Raleigh |
| 8,331,901 B2 | 12/2012 | Raleigh |
| 8,842,578 B1 * | 9/2014 | Zisapel ............... H04L 43/045 370/255 |
| 9,258,237 B1 * | 2/2016 | Smith ................. H04L 47/122 |
| 2008/0095138 A1 | 4/2008 | Wu et al. |
| 2010/0085914 A1 | 4/2010 | Kunniyur et al. |
| 2010/0188975 A1 | 7/2010 | Raleigh |
| 2010/0188990 A1 | 7/2010 | Raleigh |
| 2010/0188991 A1 | 7/2010 | Raleigh |
| 2010/0188992 A1 | 7/2010 | Raleigh |
| 2010/0188993 A1 | 7/2010 | Raleigh |
| 2010/0188994 A1 | 7/2010 | Raleigh |
| 2010/0188995 A1 | 7/2010 | Raleigh |
| 2010/0190470 A1 | 7/2010 | Raleigh |
| 2010/0191575 A1 | 7/2010 | Raleigh |
| 2010/0191576 A1 | 7/2010 | Raleigh |
| 2010/0191604 A1 | 7/2010 | Raleigh |
| 2010/0191612 A1 | 7/2010 | Raleigh |
| 2010/0191613 A1 | 7/2010 | Raleigh |
| 2010/0191846 A1 | 7/2010 | Raleigh |
| 2010/0191847 A1 | 7/2010 | Raleigh |
| 2010/0192120 A1 | 7/2010 | Raleigh |
| 2010/0192170 A1 | 7/2010 | Raleigh |
| 2010/0192207 A1 | 7/2010 | Raleigh |
| 2010/0192212 A1 | 7/2010 | Raleigh |
| 2011/0103374 A1 | 5/2011 | Lajoie et al. |
| 2011/0107364 A1 | 5/2011 | Lajoie et al. |
| 2011/0107379 A1 | 5/2011 | Lajoie et al. |
| 2012/0088470 A1 | 4/2012 | Raleigh |
| 2012/0089845 A1 | 4/2012 | Raleigh |
| 2012/0134291 A1 | 5/2012 | Raleigh |
| 2012/0195206 A1 | 8/2012 | Raleigh |
| 2012/0195222 A1 | 8/2012 | Raleigh |
| 2012/0195223 A1 | 8/2012 | Raleigh |
| 2012/0196565 A1 | 8/2012 | Raleigh |
| 2012/0197792 A1 | 8/2012 | Raleigh |
| 2012/0201133 A1 | 8/2012 | Raleigh |
| 2012/0203677 A1 | 8/2012 | Raleigh |
| 2012/0208496 A1 | 8/2012 | Raleigh |
| 2012/0209750 A1 | 8/2012 | Raleigh |
| 2012/0210391 A1 | 8/2012 | Raleigh |
| 2012/0214441 A1 | 8/2012 | Raleigh |
| 2013/0160008 A1 * | 6/2013 | Cawlfield ............ G06F 9/45558 718/1 |
| 2013/0198319 A1 * | 8/2013 | Shen ...................... G06F 9/455 709/217 |
| 2014/0229607 A1 * | 8/2014 | Jung ................. H04L 43/0876 709/224 |
| 2014/0259015 A1 * | 9/2014 | Chigusa .............. G06F 9/45558 718/1 |
| 2014/0344440 A1 * | 11/2014 | Dutta .................. H04L 41/0823 709/224 |
| 2015/0134828 A1 * | 5/2015 | Ramanathan ......... H04L 47/821 709/226 |
| 2016/0234104 A1 * | 8/2016 | Hoffmann ........... H04L 41/0806 |
| 2016/0308981 A1 * | 10/2016 | Cortes Gomez ........ H04L 67/16 |
| 2016/0309345 A1 * | 10/2016 | Tehrani ............. H04W 72/0426 |
| 2017/0149632 A1 * | 5/2017 | Saltsidis ........... H04L 41/5054 |

FOREIGN PATENT DOCUMENTS

| | | |
|---|---|---|
| WO | 01/17169 A2 | 3/2001 |
| WO | 01/17313 A1 | 3/2001 |
| WO | 01/46846 A2 | 6/2001 |
| WO | 01/46889 A2 | 6/2001 |
| WO | 2010/088072 A1 | 8/2010 |
| WO | 2010/088073 A1 | 8/2010 |
| WO | 2010/088074 A1 | 8/2010 |
| WO | 2010/088075 A1 | 8/2010 |
| WO | 2010/088076 A1 | 8/2010 |
| WO | 2010/088080 A1 | 8/2010 |
| WO | 2010/088081 A1 | 8/2010 |
| WO | 2010/088082 A1 | 8/2010 |
| WO | 2010/088083 A1 | 8/2010 |
| WO | 2010/088085 A1 | 8/2010 |
| WO | 2010/088086 A1 | 8/2010 |
| WO | 2010/088087 A1 | 8/2010 |
| WO | 2010/088094 A1 | 8/2010 |
| WO | 2010/088095 A1 | 8/2010 |
| WO | 2010/088096 A1 | 8/2010 |
| WO | 2010/088097 A1 | 8/2010 |
| WO | 2010/088098 A1 | 8/2010 |
| WO | 2010/088100 A1 | 8/2010 |
| WO | 2010/088101 A1 | 8/2010 |
| WO | 2011/053858 A1 | 5/2011 |

* cited by examiner

SYSTEM, METHOD, AND COMPUTER PROGRAM FOR OPTIMIZING A CHAIN OF VIRTUAL NETWORK FUNCTIONS IN A NETWORK BASED ON NETWORK FUNCTION VIRTUALIZATION (NFV)

CLAIM OF PRIORITY AND RELATED APPLICATIONS

This application claims the benefit of: U.S. Provisional Application No. 61/918,597, filed Dec. 19, 2013; U.S. Provisional Application No. 61/941,380, filed Feb. 18, 2014; U.S. Provisional Application No. 61/981,116, filed Apr. 17, 2014; U.S. Provisional Application No. 62/026,508, filed Jul. 18, 2014; and U.S. Provisional Application No. 62/026,512, filed Jul. 18, 2014, the entire contents of which are incorporated herein by reference.

FIELD OF THE INVENTION

The present invention relates to telecommunications and/or data communications and, more particularly to network function virtualization (NFV) of telecommunications networks.

BACKGROUND

Network Function Virtualization is a term or a name of a proposed architecture of telecom services as published by the European Telecommunications Standards Institute (ETSI) in a series of documents available from the ETSI website. NFV uses generic hardware platform and software adapted for the generic hardware platform. Thus, NFV creates a network much more flexible and dynamic than a legacy communication network. In NFV-based networks, a Virtual Network Function (VNF) decouples the software implementation of the network function from the infrastructure resources it runs on by virtualization. A network service is based on one or more VNFs and/or Physical Network Functions (PNFs), their interconnections, and chaining definitions. The VNFs can be executed on almost any generic hardware processing facility. Therefore, VNFs may be installed, removed, and moved between hardware facilities, much more easily, less costly and thus, more frequently.

The flexibility of the NFV-based network enhances the means available for optimizing the network's capacity and performance, for example, by migrating VNFs between processing units according to the changing demands. A service provided by the communication network may be implemented using a plurality of VNFs interconnected as a group. The connectivity of, and inter-dependence between, VNFs making the group, or the service, create limitations and constraints on the optimization process. There is thus a need for addressing these and/or other issues associated with the prior art.

SUMMARY

According to one aspect of the present invention there is provided a system, method, and computer program product for deploying a plurality of virtual network function (VNF) instances in a communication network using network function virtualization (NFV-based network), where the network includes a plurality of computing-related units and communication links in-between, the method including: determining at least one performance value for at least one of the computing-related units and communication links, determining at least one performance requirement for at least one of the VNF instances, and associating the at least one VNF instance with at least one of the computing-related units and the communication links according to the at least one performance requirement and the at least one performance value.

DETAILED DESCRIPTION

Figure 1:
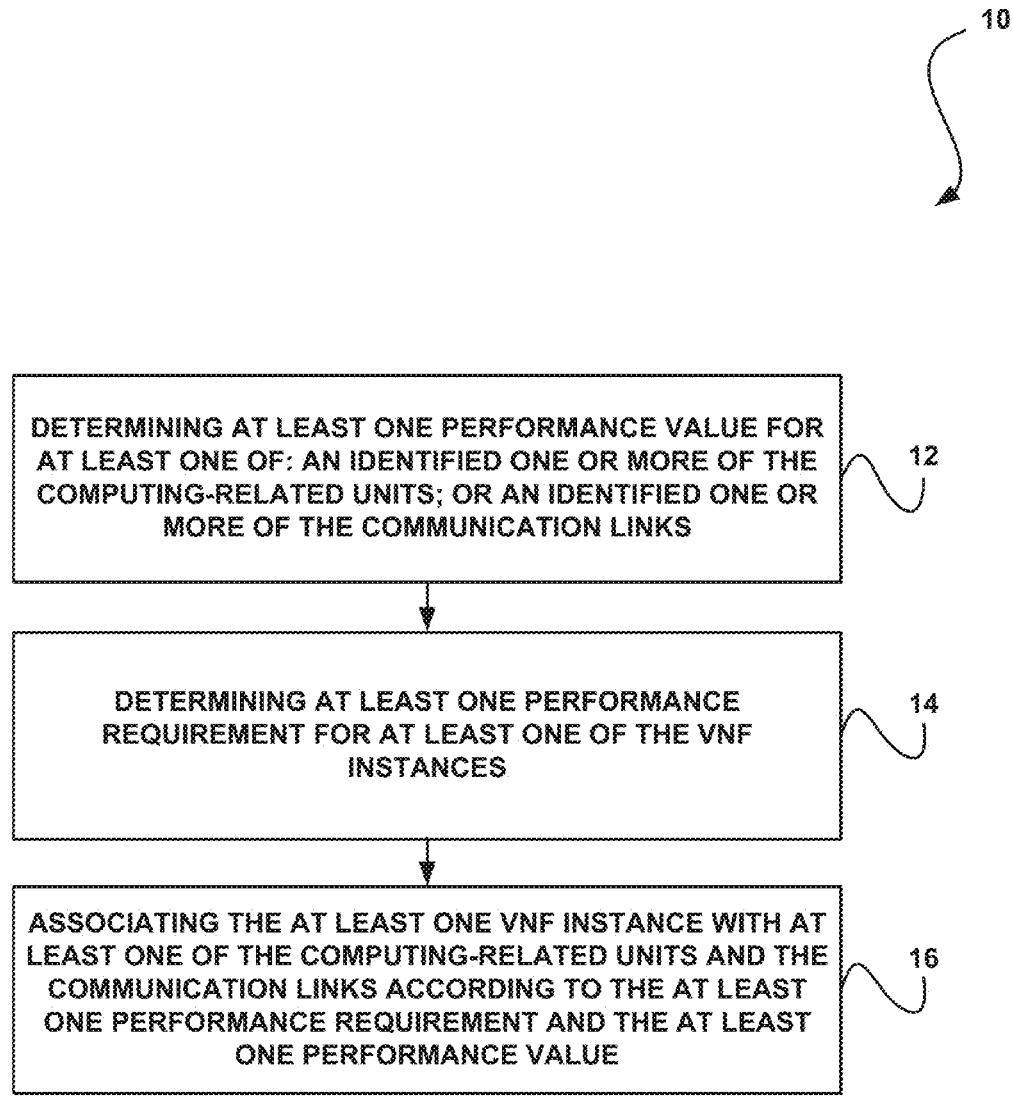
FIG. 1 is a simplified illustration of a method deploying a plurality of virtual network function (VNF) instances in a communication network using network function virtualization (NFV-based network), in accordance with one embodiment.

FIG. 1 is a simplified illustration of a method 10 for deploying a plurality of virtual network function (VNF) instances in a communication network using network function virtualization (NFV-based network), where the network includes a plurality of computing-related units and communication links in-between, in accordance with one embodiment.

As shown in FIG. 1, at least one performance value is determined for at least one of the computing-related units and communication links. See operation 12. Additionally, at least one performance requirement is determined for at least one of the VNF instances. See operation 14. Further, the at least one VNF instance is associated with at least one of the computing-related units and the communication links according to the at least one performance requirement and the at least one performance value. See operation 16.

In one embodiment, the determined at least one performance value is provided by the at least one of the identified one or more of the computing-related units or the one or more of the communication links. Additionally, in one embodiment, the at least one VNF instance is associated with the at least one of the identified one or more of the computing-related units or the one or more of the communication links.

In another embodiment, the method 10 may include determining at least one performance requirement between at least two of the VNF instances and associating the at least two VNF instances with one of the computing-related units and the communication links according to the at least one performance requirement.

In another embodiment, the method 10 may include: determining at least one performance threshold; and associating the at least one VNF instance with at least one of the computing-related unit and the communication link according to the at least one performance threshold and at least one of the at least one performance requirement and the at least one performance value.

In yet another embodiment, the method 10 may include: determining at least one interdependency between at least two VNF instances; associating the at least two VNF instances to form a cluster; determining at least one performance requirement for the cluster; and associating the cluster with at least one of the computing-related units and the communication links according to the at least one cluster performance requirement and the at least one performance threshold.

According to another embodiment, the method 10 may include: determining the at least one interdependency according to at least one performance requirement between the at least two VNF instances. In this case, the method 10 may further include determining the at least one interdependency according to at least one performance requirement between the at least two VNF instances and the at least one performance threshold or adding at least one VNF instance to the cluster according to the at least one performance threshold. As another option, the method 10 may further include: determining interdependencies between the first cluster and at least one of VNF instance not included in the first cluster and another cluster; associating the first cluster with a processing unit; and associating the at least one of another cluster and VNF instance with another processing unit according to the interdependencies between the first cluster and at least one of another cluster and VNF instance.

As another option, the method 10 may include: defining at least one type of processing unit to form a processing unit type; associating at least one processing unit with at least one processing unit type; and at least one of: associating the first cluster with a processing unit comprises associating the first cluster with a processing unit type; and associating the at least one of another cluster and VNF instance with another processing unit comprises associating the first cluster with a processing unit type.

In another embodiment, the method 10 may further include: initiating the VNF instances as a sub-network of VNF instances operative within the network of processing units; detecting a change of load for the sub-network of VNF instances; identifying an alternative processing unit for at least one of the VNF instances and cluster, where the alternative processing unit complies with the interdependencies and the change of load; and migrating the at least one of the VNF instances and cluster to the alternative processing unit, where the migration is executed during run-time and without degrading performance of the sub-network of VNF instances.

In another embodiment, the method 10 may include at least two clusters being arranged in at least one configuration of the group including: the clusters have at least one VNF instance in common; and one cluster includes another cluster. In this case, the method 10 may include migrating a VNF instance of a cluster dictates migration of other VNF instances of the cluster to the same processing unit. In another case, the method 10 may include that a cluster is migrated to the alternative processing unit; the migration is executed during run-time; and processing is diverted to VNF instances in the alternative processing unit only after all VNF instances of the cluster are migrated to the alternative processing unit.

Still yet, in one embodiment, the method 10 may include at least two clusters arranged in at least one configuration of the group including: and the clusters have at least one VNF instance in common; and one cluster includes another clusters. In this case, the method may include migrating a VNF instance of one of the two clusters dictates migration of the other cluster of the two clusters.

In the context of the present description, the terms "network" and "communication network" refer to the hardware and software connecting one or more communication elements including wireline networks, wireless networks, and/or combinations thereof.

The terms "network function virtualization" (NFV) and virtual network function (NFV) are described in a series of documents published by the European Telecommunications Standards Institute (ETSI) and available from the ETSI website. The term "virtual network function or feature" (VNF) refers to a particular implementation of a function, a feature, or a service provided by the network, internally within the network, or externally to a customer, subscriber, end-user, a terminal or a server. A VNF may include the software program implementation of the function or feature or service. The term VNF instance (VNF-I) refers to a particular process or task executing the VNF program by a particular virtual machine or processor or computing facility and/or used by a particular customer (or subscriber, end-user, terminal or server, etc.).

The term "service" refers to any type of use (such as a use case) that a NFV-based communication network may offer or provide to one or more communication elements. A service may include switching data or content between any number of elements, providing content from a server to a communication element or between servers, securing and protecting communication and content, processing content provided by the customer or by a third party, providing backup and redundancy, etc. A service may be using partial functionality of a VNF or may include one or more VNFs and/or one or more VNF instances forming a service sub-network (or interconnection model). In the context of the present description, the term "chain" may refer to such service sub-network, such as a particular plurality of VNFs and/or VNF instances associated with a particular service type or a service instance.

The term "deployment", when referring to hardware elements, including processing elements, memory elements, storage elements, connectivity (communication) elements, etc., refer to the configuration or topology of these hardware elements creating the NFV-based network. The term "deployment", when referring to software elements, such a VNFs and VNF instances, refers to the association between such software elements and hardware elements.

The term "deployment optimizations" refers to association of software and hardware elements in a manner that satisfies a particular set of requirements and/or rules, such as load-related and performance-related requirements, or a manner that makes a better use of a particular hardware deployment, such as by reducing operational cost.

The terms "service deployment optimization", or "service optimization" or "chain optimization" refer to optimizing the deployment of a service chain, i.e., optimizing the deployment of one or more VNF instances making a particular service. The terms chain optimization and service optimization may thus be used interchangeably.

The term "session" refers to a communication connection between two or more entities that persists for a period of time during which data may be exchanged there between. A session may be implemented and managed by a session layer in the corresponding network protocol. The term session may include a network session and a logical session. The network session may be associated with the devices used to communicate, while the logical session may be associated with the communicating parties (users) and may persist regardless of the communication means that the parties are using.

The term "service continuity" includes and applies to the terms "session continuity" and "streaming continuity". Streaming refers to streaming media, session or service, such as sound (including voice), video, multimedia, animation, etc. The term service usually applies to a group of VNFs (or the functionality provided by the group of VNFs) but may also apply to a single VNF (or the functionality provided by the VNF). The term "continuity" indicates that the session or the service is not interrupted, or that an interruption is short enough that a user is not aware of such interruption, or that the interruption does not cause any loss of data, or that the loss is handled in acceptable manner (e.g. a few packets of speech lost, but the conversation can continue, etc.).

The term "availability" or "service availability" refers to a level of the service, or a characteristic of the service, in which the service provider should provide the service, albeit possible hardware or software faults. For example, the service provider may obligate to the customer to provide a particular level of processing power, communication features such as bandwidth, latency, and jitter, database consistency, etc. Such level or characteristic of the service should be available to the customer even when a hardware component or a software component providing the service do not function properly. Providing availability may therefore require additional resources such as backup resources and/or mirroring. Hence "availability" may also refer to the terms "fault recovery" and "redundancy".

The term "fault recovery" refers to the process of recovering one or more of the network's services, functions, and features after a fault, whether caused by a hardware malfunction, a system crash, a software bug or a security breech or fault. A hardware malfunction includes, but is not limited to, any type of inadequate performance associated with, for example, power supply, processing units, memory, storage, transmission line, etc. The term "fault recovery" also applies to recovering the functionality of one or more VNFs or VNF instances with respect to any of the above. The terms security breech or security fault may be used interchangeably.

The term "redundancy" refers to any type of component of the network that is fully or partly duplicated, provided in standby mode, or otherwise available, to replace another component of the network when that other component stops functioning properly or otherwise indicates some kind of fault. Redundancy may apply, but is not limited to, hardware, software, data and/or content.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

The principles and operation of a system, method, and computer program product for deploying a plurality of VNF instances according to various embodiments may be further understood with reference to the following drawings and accompanying description.

Figure 2:
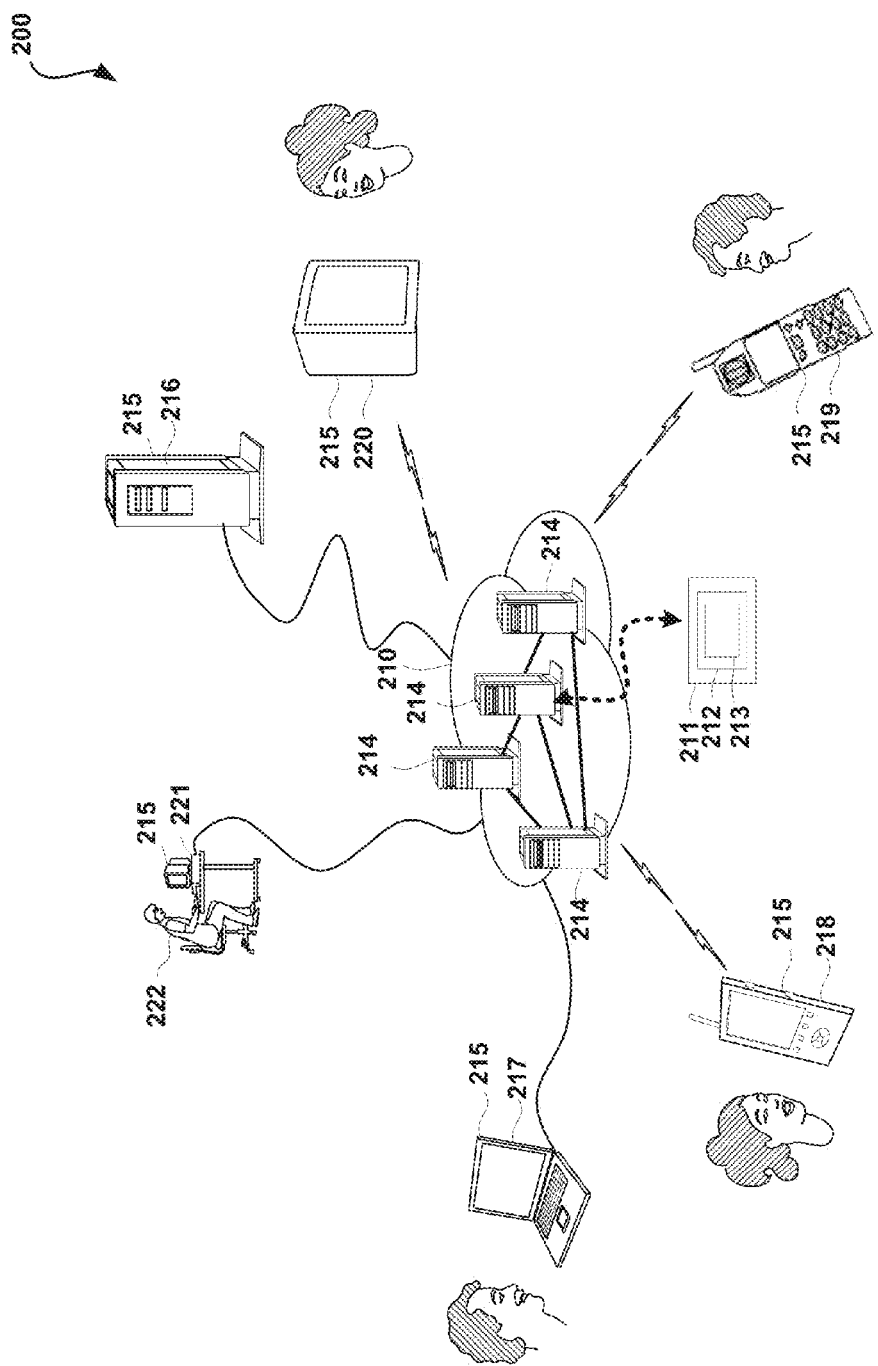
FIG. 2 is a simplified illustration of an NFV-based communication network including a chain optimization module, in accordance with one embodiment.

FIG. 2 illustrates a simplified diagram of a system 200 associated with an NFV-based communication network 210, in accordance with one embodiment. As an option, the system 200 may be implemented in the context of the details of FIG. 1. Of course, however, system 200 may be implemented in the context of any desired environment. Further, the aforementioned definitions may equally apply to the description below.

A service provided by the communication network may be implemented using one or more VNFs. Otherwise put, a service is a group, or a chain of interconnected VNFs. The VNFs making the group, or the service, may be installed and executed by a single processor, by several processors on the same rack, within several racks in the same data-center, or by processors distributed within two or more data-centers. The techniques described herein relate to optimizing the deployment of a service in a communication network using network function virtualization, and to optimizing the deployment of a group, or a chain, of virtual network functions (VNFs) in an NFV-based network. Therefore the term "chain optimization" refers to the planning and/or managing the deployment of VNFs making a chain, or a group, of VNF providing a particular service.

As shown in FIG. 2, at least one NFV-based network 210 is provided. The NFV-based communication network 210 includes an NFV management system 2111, and an NFV-orchestration (NFV-O) module 212, and a chain optimization module 213, according to one embodiment.

In the context of the present network architecture, the NFV-based network 210 may take any form including, but not limited to a telecommunications network, a local area network (LAN), a wireless network, a wide area network (WAN) such as the Internet, peer-to-peer network, cable network, etc. While only one network is shown, it should be understood that two or more similar or different NFV-based networks 210 may be provided.

The NFV-based network 210 may include one or more computation facilities 214, each including one or more hardware units and being interconnected by communication links to form the NFV-based network 210. At least one of the computation facilities 214 may include the NFV management system 211. The NFV management system 211 may include the NFV-O module 212.

The NFV-O module 212 may be executed by one or more processors, or servers, such as computation facilities 214, of the NFV-based network 210. The NFV-O module 212 may be executed as an NFV-O instance or component. The NFV-O module 212 may therefore include a plurality of NFV-O instances or components as will be further explained below.

The chain optimization module 213 may be a part or a component of the NFV-O module 212. However, the chain optimization module 213, the NFV-O module 212 and the NFV management system 211 may be separate software programs provided by different vendors. In one embodiment, the NFV-based network 210 may even have a plurality of any of the NFV management systems 211, the NFV-O modules 212, and/or the chain optimization module 213.

A plurality of devices 215 are communicatively coupled to the NFV-based network 210. For example, a server computer 216 and a computer or terminal 217 may be coupled to the NFV-based network 210 for communication purposes. Such end-user computer or terminal 217 may include a desktop computer, a lap-top computer, a tablet computer, and/or any other type of logic or data processing device. Still yet, various other devices may be coupled to the NFV-based network 210 including a personal digital assistant (PDA) device 218, a mobile phone device 219, a television 220 (e.g. cable, aerial, mobile, or satellite television, etc.) 2, etc. These devices 215 may be owned and/or operated by end-users, subscribers and/or customers of the NFV-based network 210. Others of the devices 215, such as administration station 221, may be owned and/or operated by the operator of the NFV-based network 210.

A network administrator 222 may supervise at least some aspects of the operation of the NFV-based network 210 by controlling an NFV infrastructure including the NFV management system 211, the NFV-O 212, and the chain optimization module 213.

Figure 3:
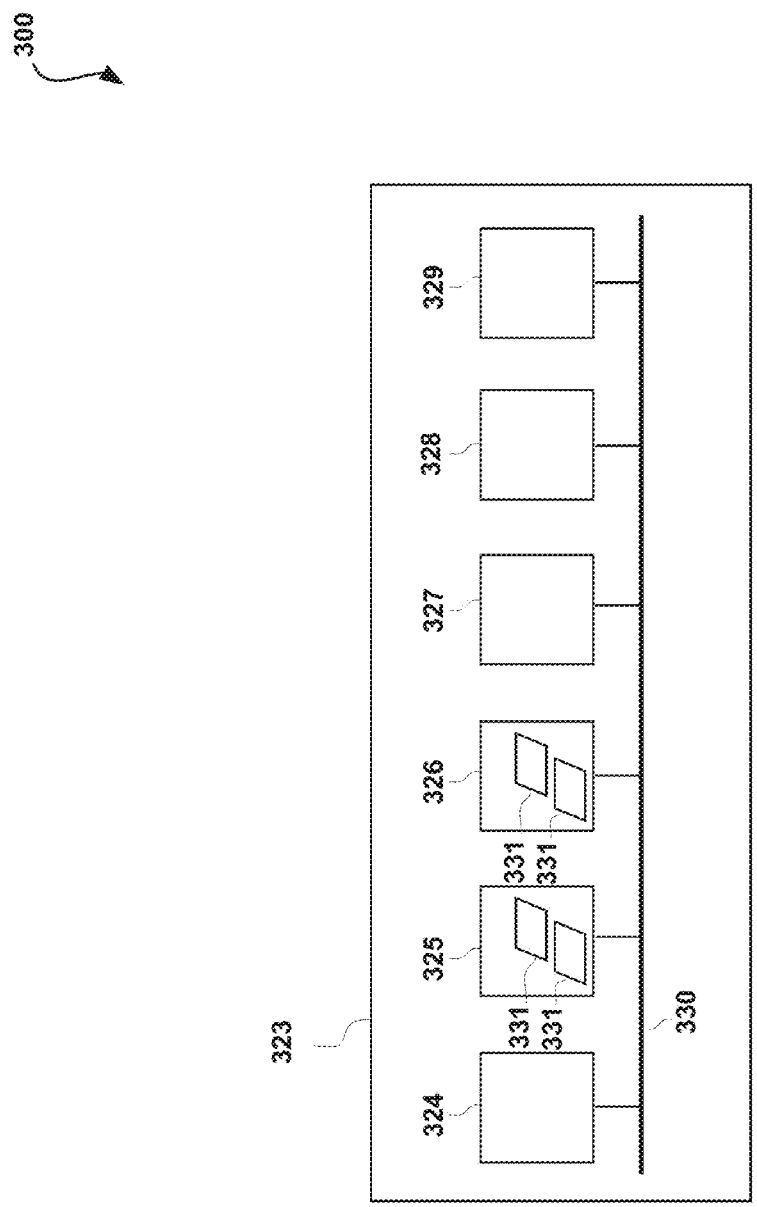
FIG. 3 is a simplified block diagram of a hardware unit of an NFV-based network, in accordance with one embodiment.

FIG. 3 illustrates a simplified block diagram 300 of a hardware unit 323 of an NFV-based network, in accordance with one embodiment. As an option, the block diagram 300 may be viewed in the context of the details of the previous Figures. Of course, however, block diagram 300 may be viewed in the context of any desired environment. Further, the aforementioned definitions may equally apply to the description below.

In one embodiment, the hardware unit 323 may represent a computing facility 214 of FIG. 2, or a part of a computing facility 214. The hardware unit 323 may include a computing machine. The term computing machine relates to any type or combination of computing devices, or computing-related units, including, but not limited to, a processing device, a memory device, a storage device, and/or a communication device.

The hardware unit 323 may therefore be a network server, and the computing facility 214 may be a plurality of network servers, or a data-center, including cloud-based infrastructure. As an option, the hardware unit 323 may be implemented in the context of any of the devices of the NFV-based network 210 of FIG. 2 and/or FIG. 5 and in any desired communication environment.

Each hardware unit 323 (or computing machine, computing device, computing-related unit, and/or hardware component, etc.), including each communication link between such hardware units, may be associated with one or more performance type and a respective performance rating or value, where the hardware unit and/or communication link is operative to provide the performance value. Performance types are, for example, processing power, cash memory capacity, regular memory capacity (e.g. RAM, dynamic, or volatile memory, etc.), non-volatile memory (e.g. such as flash memory, etc.) capacity, storage capacity, power, cooling, bandwidth, bitrate, latency, jitter, bit error rate, and packet loss, etc. Virtual machines may run on top of the hardware unit 323 and a VNF may be run on one or more of such virtual machines.

The hardware unit 323 may be operative to provide computing infrastructure and resources for any type and/or instance of software component executed within the NFV-based network 210 of FIG. 2. In this regard, the hardware unit 323 may be operative to process any of the processes described herein, including but not limited to, any NFV-related software component and/or process. The hardware unit 323 is operative to process virtual network functions (VNFs), VNF instances, network function virtualization orchestration (NFV-O) software, modules and functions, data center management software, and/or cloud management systems (CMS), etc.

In various embodiments, the hardware unit 323 may include at least one processor unit 324, one or more memory units 325 (e.g. random access memory (RAM), a non-volatile memory such as a Flash memory, etc.), one or more storage units 326 (e.g. including a hard disk drive and/or a removable storage drive, representing a floppy disk drive, a magnetic tape drive, a compact disk drive, etc.), one or more communication units 327, one or more graphic processors 328 and displays 329, and one or more communication buses 330 connecting the various units/devices.

The hardware unit 323 may also include one or more computer programs 331, or computer control logic algorithms, which may be stored in any of the memory units 325 and/or storage units 326. Such computer programs, when executed, enable the hardware unit 323 to perform various functions (e.g. as set forth in the context of FIG. 1, etc.). The memory units 325 and/or the storage units 326 and/or any other storage are possible examples of tangible computer-readable media.

It is appreciated that computer program 331 may include any of the NFV management system 211, the NFV-O 212, and/or the chain optimization module 213 of FIG. 2.

Figure 4:
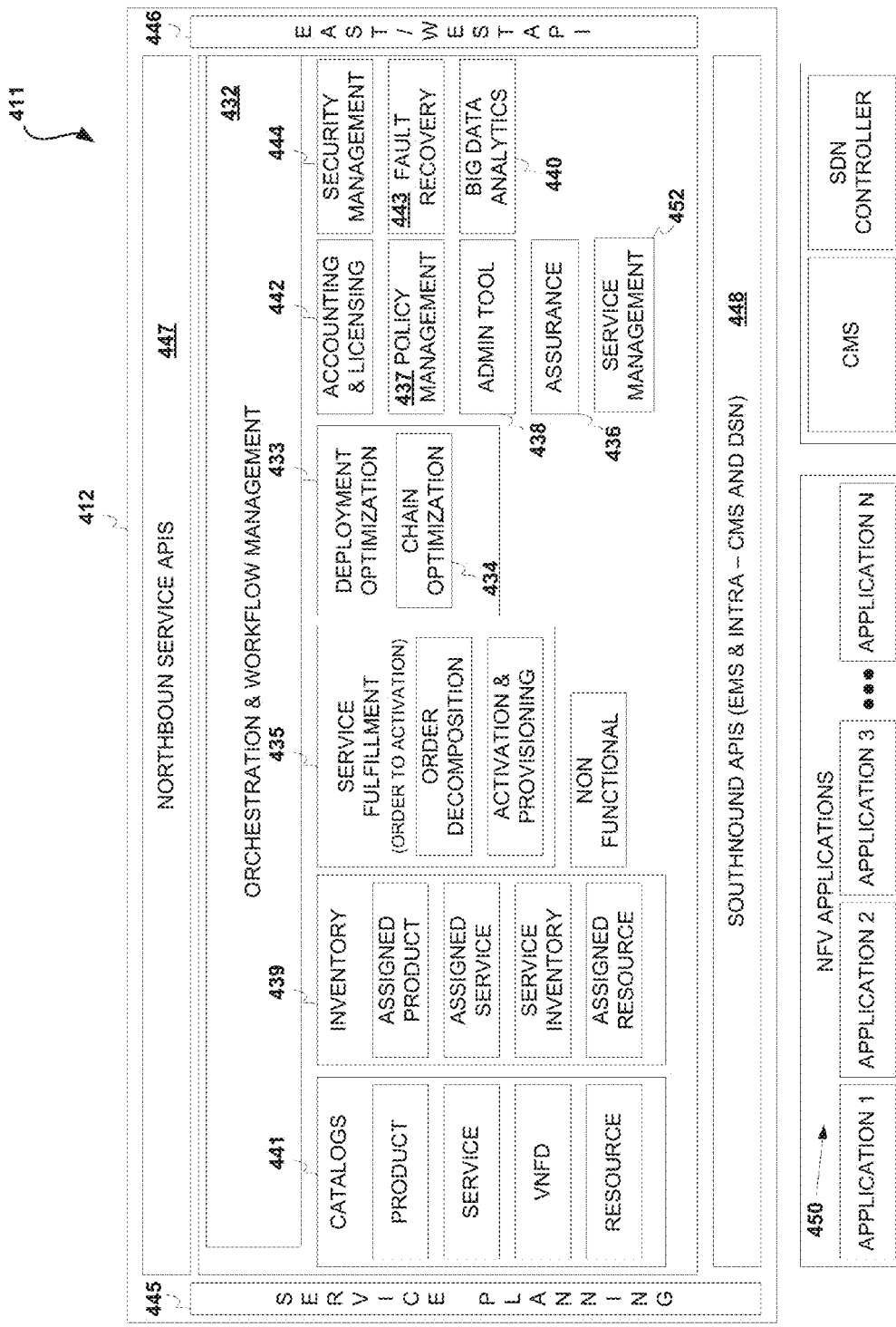
FIG. 4 is a simplified block diagram of NFV-infrastructure including network function virtualization orchestration layer (NFV-O), including chain optimization module, in accordance with one embodiment.

FIG. 4 illustrates a simplified diagram of an NFV management system 411, in accordance with one embodiment. As an option, the NFV management system 411 may be implemented in the context of the details of the previous Figures. For example, in one embodiment, the NFV management system 411 may represent the NFV management system 211 of FIG. 2. Of course, however, the NFV management system 411 may be implemented in the context of any desired environment. Further, the aforementioned definitions may equally apply to the description below.

In one embodiment, the NFV management system 411 may include an NFV-O module 412. The NFV management system 411 may include one or more NFV-O modules 412. In various embodiments, each of the NFV-O modules 412 may include orchestration and workflow management 432 that is responsible for managing (i.e. orchestrating) and executing all NFV-O processes, including inbound and/or outbound communication and interfaces.

The NFV management system 411 may include a deployment optimization module 433 that enables a user to devise automatic mechanisms for network optimizations. The deployment optimization module 433 may operate these mechanisms automatically and continuously to optimize the distribution of VNFs 450 and their VNF instances in real-time (or near-real-time) by migrating VNFs 450 and VNF instances (e.g. VNF instances 551 of FIG. 5, etc.) between hardware units (e.g. hardware units 551 of FIG. 5, etc.).

More information regarding possible processes and/or embodiments for performing optimization of VNF deployment as may be performed by deployment optimization module 433 may be found in U.S. Provisional Patent Application No. 61/941,380, titled "System, Method, And Computer Program For Managing Hierarchy and Optimization In A Network Function Virtualization (NFV) Based Communication Network", and U.S. patent application Ser. No. 14/572,719, now U.S. Pat. No. 9,430,262, titled "System, Method, And Computer Program For Managing Hierarchy and Optimization In A Network Function Virtualization (NFV) Based Communication Network", which are incorporated by reference herein in their entirety.

The NFV management system 411 may also include a chain optimization module 434. The chain optimization module 434 may be a part of deployment optimization module 433 and may enable a user to devise automatic mechanisms for optimizing the deployment of chains or groups of VNFs 450 and VNF instances. A service provided by an NFV-based network is typically made of a particular chain or group of particular VNFs 450 and their respective VNF instances. The chain optimization module 434 optimizes the deployment of chains or groups of services between hardware units according to the requirements and specifications associated with and/or adapted to the particular service, or chain, or a group.

The chain optimization module 434 may operate these mechanisms automatically and continuously to optimize in real-time the operation of chains or groups of the VNFs 450 and their VNF instances by re-planning their distribution among hardware units and optionally also by migrating the VNFs 450 and associated VNF instances between hardware units.

The NFV management system 411 may also include a service fulfillment module 435 that manages service and resource (e.g. VNF) instance lifecycle activities as part of the process and orchestration activities. This may include on boarding, initiation (e.g. instantiation), installation and configuration, scaling, termination, software update (e.g. of a running VNF, etc.), test environment, and/or rollback procedure. Additionally, the service fulfillment module 435 may also provide decomposition of an order to multiple network services, and the activation of such network service as a single VNF instance, or as a chain of VNF instances.

Order decomposition includes translating business orders into a network oriented service implementation plan. For example, a business order may be decomposed into a plurality of functions, some of which may be provided by different software programs or modules (e.g. such as various VNFs) instantiated as a plurality of VNF instances across one or more data centers. Performing order decomposition, the service fulfillment module 435 may consult the deployment optimization module 433 for the best deployment option to customer order in a given network and resource condition. Performing order decomposition, the service fulfillment module 435 may then initiate the service including all its components. Order decomposition may be performed in several locations across an NFV-O hierarchy. For example, initial decomposition may be performed in the root of the NFV-O, and then further decomposition may be performed in the relevant data centers.

In one embodiment, an activation and provisioning module may provide the plan for activation and provisioning of the service to the orchestration and workflow management 432. The activation and provisioning module may also provide feedback on fulfillment status to an upper layer. This upper layer may include the business support services (BSS).

The NFV management system 411 may also include an assurance module 436 and a service management module 452 capable of gathering real time data on network elements' status and creating a consolidated view of services and network health. The assurance module 436 includes assurance functionality and may interact with the service management module 452 to perform assurance related lifecycle management procedures. Lifecycle management can be also triggered by other modules, policies, manual intervention, or from the VNFs themselves, etc. The assurance module 436 and the service management module 452 may also trigger events associated with lifecycle management and faults. The assurance module 436 and the service management module 452 may monitor the health of the network and may execute fault recovery activities.

The assurance module 436 and the service management module 452 provide the ability to monitor services' status and performance according to the required criteria. The assurance module 436 and the service management module 452 may also interact with the network infrastructure (e.g. including computing, storage, and networking, etc.) to receive the required information, analyze the information, and act upon each incident according to the defined policy. The assurance module 436 and the service management module 452 are able to interact with analytics to enrich a policy assurance module. Interfaces may also be provided for implementation by an external system.

The NFV management system 411 may also include a policy management module 437 that enables a user to define and configure offline and/or real-time policy for controlling VNF and service related rules. The policy management module 437 may contain the preconfigured policies and activities as well as selection rules for the NFV-O process to determine the preferred policy or activity to be performed for a particular process event. The policy management may be multi-layered, including vendor policy, service policy, and operator policy, etc. The policy mechanism may trigger the suitable policy layer (vendor/service/operator).

The NFV management system 411 may also include an administration module 438 that provides an overall view of the network, manual lifecycle management and intervention, and manual system administration and configuration. The administration module 438 may be operable to enable a user such as an administrator (e.g. administrator 222 of FIG. 2, etc.) to manage, view, and operate the NFV-O system. The administration module 438 may also provide a view of the network topology and services, the ability to perform specific activities such as manual lifecycle management, and changing service and connectivity configuration.

The NFV management system 411 may also include an inventory management module 439 that maintains a distributed view of deployed services and hardware resources. Inventory catalogues may reflect the current instantiation and allocation of the resources and services within the network mapped into products and/or customer entities.

The NFV management system 411 may also include a big data analytics module 440 that analyzes network and service data to support network decisions involving services and subscribers to improve network performance based on actual usage patterns. The big data analytics module 440 may also generate what-if scenarios to support business-oriented planning processes. Additionally, the big data analytics module 440 may function to analyze and evaluate the information for various planning aspects (e.g. Virtual Network Capacity Planning, Data Center Capacity Planning, Value based planning, Cost analysis for network deployment alternatives, etc.), deployment and management (e.g. Guided Operator Recommendations, What-if scenario analysis and simulation, application rapid elasticity and resource usage optimization, etc.), and may support business-oriented planning processes.

The NFV management system 411 may also include a catalog module 441 may include records defining various aspects of the network, such as products, services, and resources such as hardware units and VNFs (e.g. a VNF directory, etc.). The catalog module 441 may include a collection of centralized, hierarchical information repositories containing resource, service and product definitions with their relationship, versioning, and/or descriptors, etc. Such records may include templates enabling a user, such as an administrator, to define particular network components such as resources, products, services, etc. A resource template may define resources descriptors, attributes, activities, procedures, and/or connectivity, etc. A service template may define a service variation from resource building blocks. A product template may define parameters of a sellable product (e.g. prices, rating, etc.) based on service composition (e.g. in one embodiment, this may be part of a BSS catalogue).

The inventory management module 439, the big data analytics module 440, and/or the catalog module 441 may support multiple data centers, multiple CMSs and provide a centralized view across the infrastructure. The inventory management module 439, the big data analytics module 440, and/or the catalog module 441 may also support hybrid networks and services maintaining both physical and virtual resources.

The NFV management system 411 may also include an accounting and licensing module 442 that may be operable to record and manage network software usage data for commercial purposes including licensing, accounting, billing, and reconciliation of services with subscribers and providers. The accounting and licensing module 442 may manage licensing and usage of virtual network applications, including the ability to support complex rating schemes, based on various parameters such as CPU, memory, data, etc. The accounting and licensing module 442 may enable users to define the pricing of particular VNF modules and provide settlement with vendors. The accounting and licensing module 442 may also enable the evaluation of internal costs of services provided within the network for calculating return on investment (ROI).

The NFV management system 411 may also include a fault recovery module 443 (otherwise named disaster recovery planning module or DRP, etc.) that enables a user to plan and manage disaster recovery procedures for the NFV-O and/or the entire network.

More information regarding possible processes for managing fault recovery as may be embodied by fault recovery module 443 may be found in U.S. Provisional Patent Application No. 62/026,508, titled "System, Method, And Computer Program For Managing Fault recovery In A Network Function Virtualization (NFV) Based Communication Network", and U.S. patent application Ser. No. 14/572,726, now U.S. Pat. No. 9,645,899, titled "System, Method, And Computer Program For Managing Fault recovery In A Network Function Virtualization (NFV) Based Communication Network", which are incorporated by reference herein in their entirety.

The NFV management system 411 may also include a security management module 444 that provides the authentication authorization and accounting services of application security across the network. The security management module 444 may include, for example, an authentication module and function. In one embodiment, the authentication module and function (e.g. including identity management, etc.) may authenticate the identity of each user defined in the system. Each user may have a unique user identity and password. The system may support password based authentication with flexible password policy. Integration with external authentication providers may be done via additional system enhancements. The authorization module and function may support a role-based access control (RBAC) mechanism, where each user is assigned with one or more roles according to the business needs based on the least privileges concept (e.g. standard or administrator roles). In one embodiment, the accounting and licensing module 442 may provide an audit of security events such as authentication or login events.

As an option, the security management module 444 may use rules to protect sensitive information. For example, such rules may be used to ensure the data accessed is used for the specific purposes for which it was collected, sensitive information is encrypted when in storage/transit and masked/truncated on display and logs, and that the entire security system is deployed in the customer's intranet network (i.e. behind network/infrastructure measures), in an independent domain, etc.

In one embodiment, the NFV management system 411 may further include a Secure Development Life Cycle (SDLC) module that ensures that security aspects are handled during a project's life cycle, such as security design, security testing, etc.

As shown further in FIG. 4, the NFV management system 411 may include a service planning module 445. The service planning module 445 may be used by a communication service provider (CSP) sales representative, enterprise, and/or technician, as part of selling engagement process with enterprise/SMB customers.

The service planning module 445 may also provide the ability to interact with catalogues, customer data, network and ordering systems to provide online network service proposals for the enterprise customers with ability to quote update the proposal, validate the serviceability and network inventory, and once done, provide the service order for activation using the northbound interface.

The NFV management system 411 may also include east/west APIs 446 that include various domains/activities interfaces, including an information source to a big data repository, and interaction capability with a physical network system (OSS).

Northbound APIs 447 provides application programming interfaces (APIs) to various external software packages, such as business support system (BSS) for service order fulfillment, cancel and update activities, status notification, resource inventory view, monitoring system, assurance system, service planning tool, administration tool for system view and configuration, and big data repository, etc.

Further, the southbound APIs 448 may provide APIs for external software packages, such as CMS (including service and VNFs lifecycle activities—receiving from the infrastructure status and monitoring information for upstream system and activities [e.g. assurance]), an SDN Controller (or other connectivity system) to configure inter and intra data center connectivity, an EMS to configure the VNF, and a VNF for a direct configuration.

Figure 5:
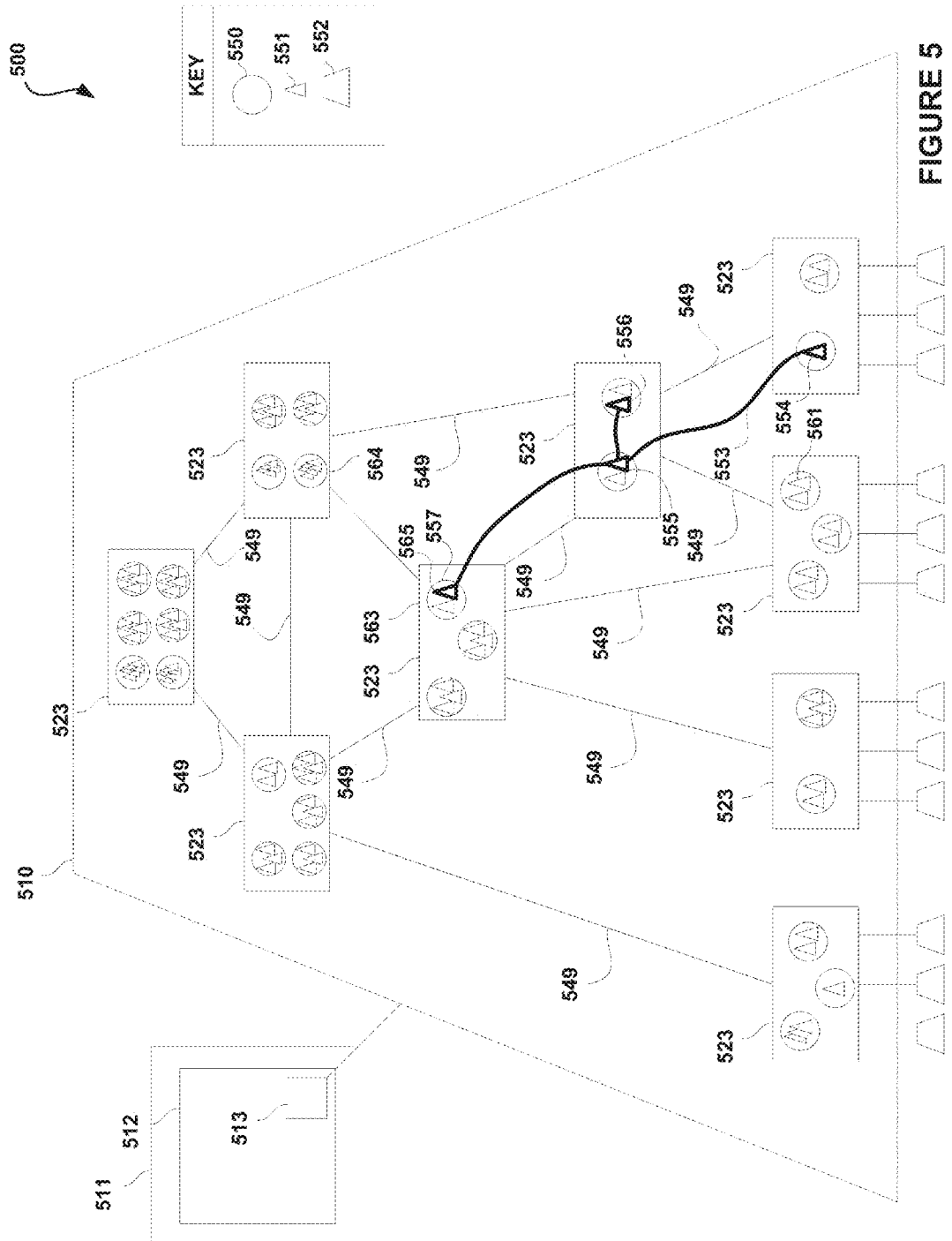
FIG. 5 is a simplified block diagram of services deployed in NFV-based network, in accordance with one embodiment.

FIG. 5 illustrates a simplified diagram 500 of a deployed NFV-based network 510, in accordance with one embodiment. As an option, the diagram 500 may be viewed in the context of the details of the previous Figures. For example, in one embodiment, the deployed NFV-based network 510 and associated elements may represent the NFV-based networks and associated elements described in the context of the previous Figures. Of course, however, the diagram 500 may be viewed in the context of any desired environment. Further, the aforementioned definitions may equally apply to the description below.

As shown in FIG. 5, the NFV-based network 510 may include hardware units 523 connected via transmission lines 549, and VNFs implemented as software programs 550 installed in hardware units 523. Some of the hardware units 523 may be directly connected to a customer. The customer may be a subscriber, an end-user, or an organization, represented herein as a terminal or a server 552, or a plurality of terminals and/or servers 552. The NFV-based network 510 may also include a NFV management system 511, an NFV-orchestration (NFV-O) 512, and a chain optimization module 513 (which may all represent elements described in the context of the previous figures, etc.).

As shown further in FIG. 5, several, typically different, VNFs 550 may be installed in the same hardware unit 523. Additionally, the same VNF 550 may be installed in different hardware units 523.

A VNF 550 may be executed by a processor of the hardware unit 523 in the form of a VNF instance 551. Therefore, a particular VNF 550 installed in a particular hardware unit 523 may be "incarnated" in (e.g. initiated, executed as, etc.) any number of VNF instances 551. The VNF instances 551 may be independent of each other. Additionally, each VNF instance 551 may serve different terminals and/or servers 552. The NFV-based network 510 connects to and between communication terminal devices 552 that may be operated by one or more customers, subscribers, and/or end-users.

It is appreciated that a network operator may manage one or more services deployed in the customer's premises. Therefore, some of the hardware units 523 may reside within the premises of the network operator, while other hardware units 523 may reside in the customer's premises. Similarly, a server, such as server computer 216 of FIG. 2, may reside in the premises of the network operator or in the customer's premises. Consequently, when the network operator provides and/or manages one or more services for a customer's terminal devices 552 such as a server computer, the NFV-based network 510 of the network operator may directly manage the VNFs 550, providing the services and their VNF instances 551.

In such situation, the NFV-based network 510 may manage the services irrespectively of the location of the terminal devices 552 (e.g. the server computer 216, etc.), whether in the premises of the network operator or in the customer's premises. In other words, the NFV-based network 510 may be managing the VNFs 550 and the VNF instances 551 providing the services, as well as the terminal devices 552 (e.g. the server computer 216, etc.) being co-located within the same computing device (e.g. the hardware unit 523, etc.), whether in the premises of the network operator or in the customer's premises or in a commercial cloud or any other place.

A service provided by the communication network may be implemented using one or more VNFs. For example, the service may be a group, or a chain of interconnected VNFs. The VNFs making the group, or the service, may be installed and executed by a single processor, by several processors on the same rack, within several racks in the same data-center, or by processors distributed within two or more data-centers. In some cases, chain optimization may be employed by optimizing the deployment of a service in a communication network using network function virtualization, and to optimizing the deployment of a group, or a chain, of virtual network functions in the NFV-based network 510. Therefore, the term "chain optimization" refers to the planning and/or managing of the deployment of VNFs making a chain, or a group, of VNFs providing a particular service.

For example, FIG. 5 shows a first service 553, including the VNFs 550 and their respective VNF instances 554, 555, 556, and 557, and a thick line. In this example, the group or chain of the VNFs 550 making first service 553 are connected as a chain of VNFs 550. However, the VNFs 550 making a service may be connected in any conceivable form such as a star, tree-root, tree-branch, mesh, etc., including combinations thereof. It is noted that the VNFs 550 may be executed by two or more VNF instances 551, such as VNF 554.

The deployment of the group or chain of the VNFs 550 making the first service 553 is therefore limited by constraints such as the capacity of the communication link 549 bandwidth and/or latency (delay).

A VNF may have a list of requirements, or specifications, such as processing power, cash memory capacity, regular memory capacity (e.g. RAM, dynamic, or volatile memory, etc.), non-volatile memory (e.g. such as flash memory, etc.) capacity, storage capacity, power requirements, cooling requirements, etc. A particular VNF instance 551 providing a particular function (e.g. to a particular customer, entity, etc.) may have further requirements, or modified requirements, for example, associated with a particular quality of service (QoS) or service level agreement (SLA). Such requirements may include maximum latency or delay, average latency and maximum variance (latency jitter), maximal allowed packet loss, etc. Other requirements may include service availability, redundancy, backup, provisions for rollback and/or recovery, fault-tolerance, and/or fail-safe operation, etc.

A service made of a chain or a group of VNFs 550 and their VNF instances 551 may have a similar list of requirements, or specifications, covering the service as a whole. Therefore, such requirements, or specifications, may imply, affect, or include, requirements, or specifications, regarding communication links between the VNFs 550 and/or the VNF instances 551. Such requirements, or specifications, may include bandwidth, latency, bit-error rate, and/or packet loss, etc. Such communication requirements or specifications may further impose deployment limitations, or constraints, requiring particular VNFs 550 and/or VNF instances 551 to reside in the same data-center, or within the same rack, or even in the same computing device, for example, sharing memory or being executed by the same processor. Security measures may add further requirements, or specifications, such as co-location of some of the VNFs 550 and/or the VNF instances 551.

In the context of FIG. 5, the NFV-based network 510 has a hierarchical structure. There may be at least four aspects of the hierarchical structure of the NFV-based network 510. The networking or traffic aspect refers to the arrangement of the transmission lines between the hardware units 523. The processing aspect refers to the arrangement of the hardware units 523. The software aspect refers to the arrangement of the VNFs 550. The operational aspect refers to the arrangement of the VNF instances 551.

One aspect of the optimization process in an NFV-based network is that it may be based on real-time needs, rather than long-term, statistically anticipated, needs. One potential limitation on network reconfiguration in NFV-based networks is that network configuration does not result in a deterioration beyond acceptable level of any of the current services. The NFV deployment module (e.g. module 433 of FIG. 4, etc.) may function to enable and manage migration of services between the hardware units 523, the VNFs 550, and the VNF instances 551 in real-time, without affecting or with a minimal effect on the availability of a service, and while securing service and session continuity.

In the context of the current description, the term "continuous" means that the deployment optimization module and/or a chain optimization module (e.g. the chain optimization module 434 of FIG. 4, etc.) performs the relevant optimization task or process in run-time, or real-time, or online, or on-the-fly, or repetitively and without adversely affecting the network's functionality and its services.

Unlike a legacy network, the NFV-based network may have two topologies: the topology of the hardware devices, and the topology of the VNFs (the distribution of VNFs among the hardware devices). The topology of the hardware network is relatively stable, while the VNF topology can be optimized in real-time. Another benefit of the NFV-based network is that modifying the software topology (e.g. the distribution of VNFs among the hardware devices) is much less costly than any modification of the hardware topology. However, any modification of the network has its cost, including the cost of making such modification possible. Added cost may result from the need to process the modification of the topology and the re-distribution of VNF instances and to maintain excess resources for such purpose.

Thus, in some cases, it may be desired to localize the NFV-O 512, and particularly the deployment optimization processes associated with the deployment optimization module and the chain optimization module to reduce the cost, and simultaneously to secure the possibility to expand the scope of the network managed by these processes, if needed.

Figure 6:
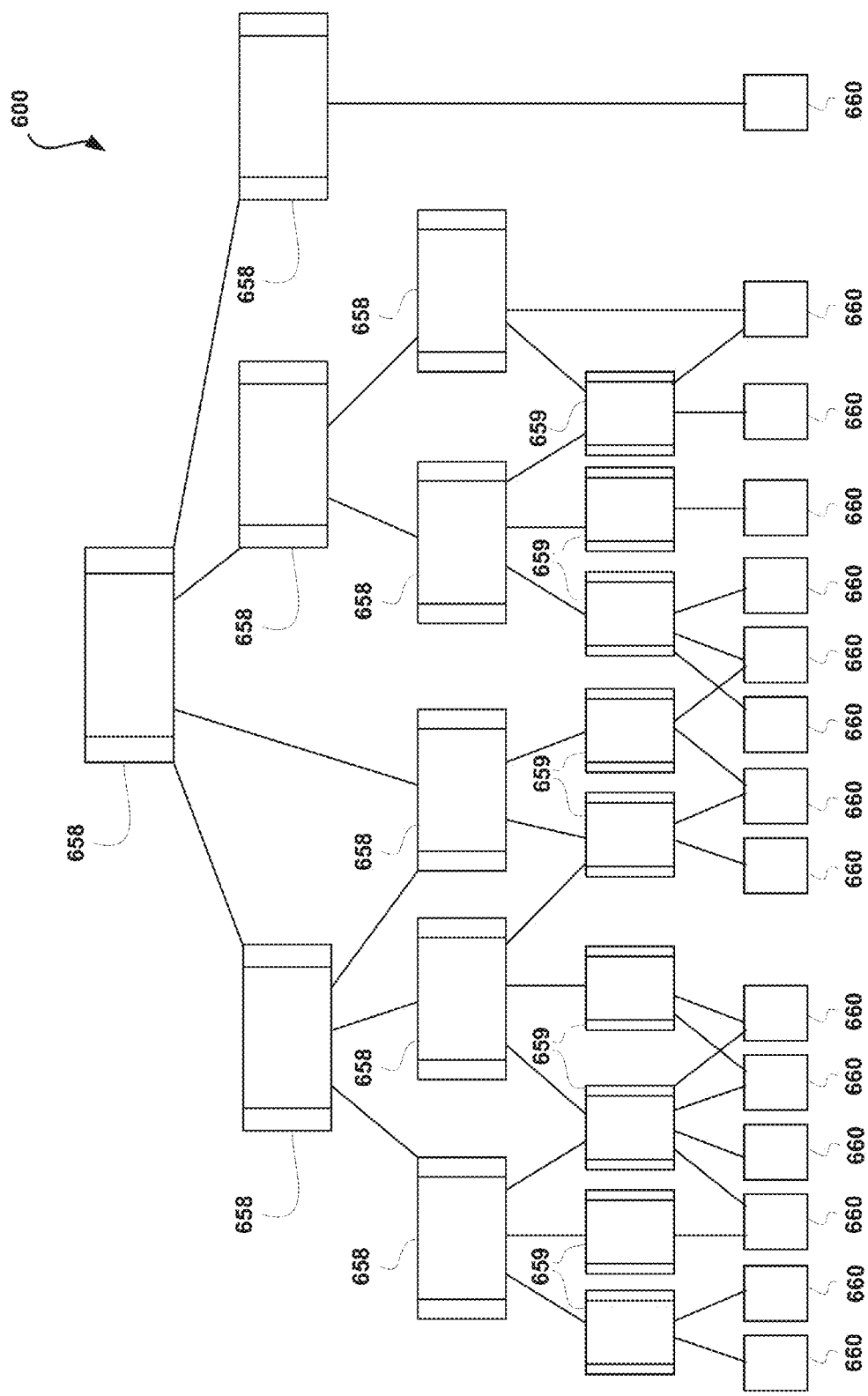
FIG. 6 is a simplified block diagram of a distributed deployment of NFV-O, in accordance with one embodiment.

FIG. 6 illustrates a simplified diagram 600 of a distributed deployment of an NFV-O, in accordance with one embodiment. As an option, the diagram 600 may be viewed in the context of the details of the previous Figures. For example, in one embodiment, the distributed deployment of the NFV-O may represent the NFV-based networks and associated elements described in the context of the previous Figures. Of course, however, the diagram 600 may be viewed in the context of any desired environment. Further, the aforementioned definitions may equally apply to the description below.

The distributed architecture of an NFV-O enables faster response to local events on one hand, and improved scalability on the other hand. In a distributed NFV-O architecture, decision processes are performed in self-contained and local decision points, closer to the customer, and closer to the events (e.g. such as network or security faults, etc.).

The hierarchy of a distributed NFV-O can be viewed as a tree of two component types: a core component 658 and a leaf component 659. The NFV-O core component 658 can be a child of another core component 658, and/or a parent of one or more core components 658 or leaf components 659. A leaf component 659 cannot be a parent of a core component 658 or a leaf component 659.

Orchestration parameters managed by a particular leaf component 659 or core component 658 may be reported in real-time to the supervising (parent) core component 658. In addition to the supervision, this continuous updating process enables the supervising component to provide backup, and/or support recovery processes associated with hardware and/or software faults as well as security faults and/or breeches.

To provide redundancy, a leaf component 659 may be supervised by two or more core components 658, and child core components 658 may be supervised by two or more parent core components 658. The orchestration parameters managed by a particular core component 658 or leaf component 659 may also be mirrored to the backup core components 658. Optionally, the NFV-O core components 658 may have the same fully functional orchestration capabilities, while leaf components may be limited to simple, well defined and localized sub-orchestration tasks, and thus may provide a faster response to demands and changing load.

A cloud management system (CMS) 660 is a software package managing one or more hardware units operating one or more VNFs and executing one or more VNF instances. A CMS 660 can be managed by one or more leaf components 659 or core components 658, or combinations thereof. A CMS 660 can be located in the operator's premises or in the customer's premises or partly in both.

An NFV-O component such as a core components 658 or a leaf component 659 typically orchestrates a particular, predefined, territory. The territory may be one or more cloud management systems 660, one or more services, one or more customers, etc. Therefore, there can be an overlap between territories of different NFV-O components. For example, one NFV-O component may orchestrate a CMS 660, another NFV-O component may orchestrate a service that is at least partly provided by the same CMS 660, and additionally a third NFV-O component may orchestrate services for a particular customer connected to that same CMS 660.

If, for any reason, the first responder NFV-O component cannot resolve the problem, for example, for lack of adequate or sufficient resources within the territory of the particular NFV-O component, the problem may be escalated above to the supervising or parent NFV-O component.

The NFV-O is a central component of the network as a system and thus may present a risk from a security perspective. For example, an attack against the NFV-O may result in a total network outage. Securing the NFV-O is therefore a goal and a challenge. A distributed NFV-O architecture enhances the network resilience/endurance. When an attack on a particular instance of the NFV-O is detected the NFV-O instance may be isolated and its functionality may be transferred to one or more other NFV-O instances.

Another aspect of the NFV-O hierarchy is stratified granularity, or resolution, of the orchestration process. An NFV-based network may include a very large number of hardware elements (e.g. processors, memory units, storage units, communication links, etc.) and an even larger number of VNFs and VNF-instances. Each of the VNF-instances may have a number of requirements (e.g. such as processing power, memory size, storage size, communication bandwidth, latency and jitter, etc.). Each of these hardware elements and software modules may produce a number of load values (e.g. corresponding to their respective requirements).

All of this creates a large amount of data that should be processed continuously or repeatedly to determine possible adverse conditions (e.g. a particular overload) or a potential cost saving situation. Such situation may require deployment optimization (e.g. the planning of a newly optimized deployment of VNF-instances) and redeployment (e.g. implementing the optimized deployment). The NFV-O hierarchy enables scalability of the redeployment optimization process by distributing the process in a hierarchical manner.

One optional aspect of hierarchical deployment optimization is that higher levels in the NFV-O hierarchy processes deployment optimization in a coarser granularity (or resolution), while lower levels in the NFV-O hierarchy processes deployment optimization in a finer granularity (or resolution).

For example, while a leaf component 659 manages its part (territory) of the NFV-based network in terms of particular hardware elements (e.g. processors, memory units, storage units, communication links, etc.) and software elements (e.g. VNFs and VNF-instances), a core component may manage its part (territory) of the NFV-based network in terms of whole subordinate (child) core components 658 or leaf components 659 it supervises. Thus, such parent core component 658 may perform deployment optimization in terms of requirements and load values applied to whole subordinate (child) core components 658 or leaf components 659.

A customer may use the services of several telecom operators. For example, the customer may be an international company operating in several countries. Such a customer usually establishes a virtual private network (VPN) across this plurality of telecom operators. Considering that these operators now operate NFV-based networks, the customer may establish a service including a plurality of VNFs, where different VNFs are part of different networks. Managing such inter-operator VNF-chains, or services, requires tight coordination across different NFV-based networks.

Such coordination can be implemented using various techniques. For example, the coordination may be implemented by enabling tight coordination between NFV-Os of the different NFV-based networks. As another example, the coordination may be implemented by establishing an inter-network NFV-O module that manages one or more inter-network VNF-chains, or services of a particular customer.

Optionally, such inter-network NFV-O may supervise two or more child or leaf NFV-O modules, each within a particular NFV-based network incorporating an NFV participating in the particular VNF-chain or service. It is appreciated that NFV-Os of different operators may be provided by different NFV-O vendors.

In a first network configuration a single NFV-O module may manage the deployment of VNFs and VNF instances throughout the entire NFV-based network. A deployment optimization module (e.g. and the chain optimization module) of the NFV-O module may continuously investigate the development of loads and provide alternative deployment plans. Consequently, the NFV-O module may redeploy VNFs and VNF instances and reallocate network resources accordingly.

Deployment optimization is indicated when one part of the NFV-based network is over-loaded (or approaches an overload situation) while another part of NFV-based network is relatively idle. The redeployment migrates some of the network entities (e.g. VNFs and VNF instances) from the overloaded part of NFV-based network to the relatively idle part of the NFV-based network to free resources where needed mostly. Therefore, the deployment optimization and redeployment activities may follow the changes of load distribution.

Service deployment optimization is a process of optimizing the deployment of VNF instances making a particular service. The service may be provided to a particular customer, to a group of customers or subscribers, or to the general public. The VNF instances making the service form a sub-network within the general communication network.

The general process of deployment optimization (as, for example, executed by the deployment optimization module) plans the distribution and the migration of individual VNF instances within the NFV-based network (or a part thereof, being managed by a NFV-O of a core component 658 or a leaf component 659). Service deployment optimization (as, for example, executed by the chain optimization module) plans the distribution and the migration of services within the NFV-based network (or a part thereof).

Service deployment optimization refers to each service as an entity on its own. A service entity includes the group, or chain, of VNF instances making the service. Some of the VNF instances making a service may be grouped into one or more clusters of VNF instances. In such case the service, or the VNF chain making the service, is made of one or more clusters of VNFs (and/or VNF instances) and possibly one or more VNFs (and/or VNF instances) not belonging to any cluster (un-clustered VNFs and/or VNF instances).

It is appreciated that a cluster can be nested. In this sense a cluster may include one or more clusters (sub-clusters) and/or one or more VNF (and/or VNF instance) external to the sub cluster(s).

It is therefore appreciated that the service deployment optimization (e.g., the chain optimization module) plans the distribution and/or the migration of VNFs and/or VNF instances clusters, VNF clusters (and/or clusters of VNF instances), and un-clustered VNFs and/or VNF instances.

Optimizing the deployment of VNF instances considers the requirements of each VNF instance in terms such as processing power, memory, storage, traffic (bandwidth), latency, energy consumption and cooling requirements, average demand and peak demand, etc. The goal of the optimization process is to generate higher revenues at lower expenses. For example, this may include: packing as many VNF instances as possible into the given infrastructure; providing services using less infrastructure; locating VNFs in processing units of lower operational costs (e.g. cost of electricity, cooling, etc.); and shutting down processing units of higher operational costs.

The first level of the optimization process considers the requirements of the various VNF instances to be fixed, or independent of each other. Service deployment optimization considers the second level of optimization where the requirements of a VNF instance is interdependent on the performance of one or more other VNF instances.

When VNF instances are interconnected they feed each other and therefore the load on a particular VNF instance depends on the performance of the VNF instances feeding it. Similarly, the performance of a VNF instance may depend on its ability to transfer its production to the receiving VNF instances. Service deployment optimization considers these interdependencies and makes sure that no VNF instance is idle, starved, overloaded, jammed, etc.

VNF chains are typical of services created by combining a plurality of VNFs, thus creating a chain, or a sub-network, of interconnected VNF instances. A chain of VNF instances may have any form or topology, such as: a simple linear string; tree-root topology (e.g. a concentrating network where a plurality of VNF instances are feeding a reducing number of VNF instances); tree-branch topology (e.g. an expanding network where a single VNF instance (or a small plurality) is feeding an increasing number of VNF instances; and a mesh, e.g., any combination thereof.

The chain topology affects the chain deployment optimization firstly by restricting the order of processing units allocated to VNF instances, restricting a downstream VNF to the same or a downstream processing unit. The next restriction considers run-time deployment optimization when the load on an upstream VNF instance increases beyond the allocated resource capacity. An increase of the allocated resource capacity requires the allocation of relevant resources for VNF instances downstream. Similarly, if the processing unit hosting the upstream VNF instance cannot provide the additional resource capacity and the upstream VNF instance is to be migrated, the deployment optimization makes sure that the target processing unit (where the VNF instance is to be migrated) is properly connected to the downstream VNF instances (and that the downstream VNF instances has appropriate capacity to process the increased throughput). Similarly, if the processing unit hosting the upstream VNF instance cannot provide the additional resource capacity and the upstream VNF instance is to be duplicated. In other words, any change to the chain topology should consider the adequate capacities of VNF instances downstream.

For example, a situation is considered in which a sub network is ending with a single terminal server. The term "terminal" here refers to a server terminating the sub-network. The server is, for example, a processing device typically owned by a customer. The server is generating and/or consuming a large amount of data. In this respect, the terminal server may feed information to a plurality of consumer terminals or receive information from a plurality of consumer terminals. In both situations the sub-network is tree-like (root or branch) with the terminal server at the tree-trunk. This example, considers a throughput increase at the terminal server that reaches beyond the capacity of the processing of the terminal server. The deployment planning and optimization may consider two options to resolve the developing problem.

The first option is increasing the sub-network breadth. For example, if the terminal server is connected to an additional processing unit of the network, and this additional processing unit has available capacity, and this additional processing unit is adequately connected to the consumer terminals, it is possible to add the additional processing unit, splitting and sharing the load with the current processing unit (the processing unit nearest the terminal server). Optionally, the entire load may be moved to the additional processing unit.

The second option is to push the sub-network into the network. For example, if the terminal server is not directly connected to any additional processing unit of the network, and the transmission to the processing unit nearest the terminal server is sufficient for the added load, the deployment planning and optimization may convert the processing unit nearest the terminal server into a simple router (at least partially) and push the sub-network into the network while increasing the sub-network's breadth as deemed necessary.

An NFV-based network can plan and implement these two options in run-time, without adversely affecting the services rendered.

Reference is now made to FIGS. 7A-7D, which are simplified block diagrams of four deployment plans of a service, according to one embodiment.

The service of FIGS. 7A-7D show a service 69 made of VNF instances 50 designated by numerals 70-73, providing the service to terminals 51. Service 69 is deployed in an NFV-based communication network. Only few of the hardware units 21 of NFV-based communication network are shown in FIGS. 7A-7D. The deployment of service 69 is planned and/or optimized by a chain optimization module (not shown in FIGS. 7A-7D). FIGS. 7A-7D show four deployment options as determined by the chain optimization module according to changing situations, requirements, and/or loads.

In the example of service 69, VNF instances 71-73 are defined (by the chain optimization module) as a cluster, for example, because VNF instances 71 and 72 share a memory managed by VNF instance 73. According to another example, VNF instances 71 and 72 both have a very short latency requirement on their communication with VNF instance 73.

Figure 7:
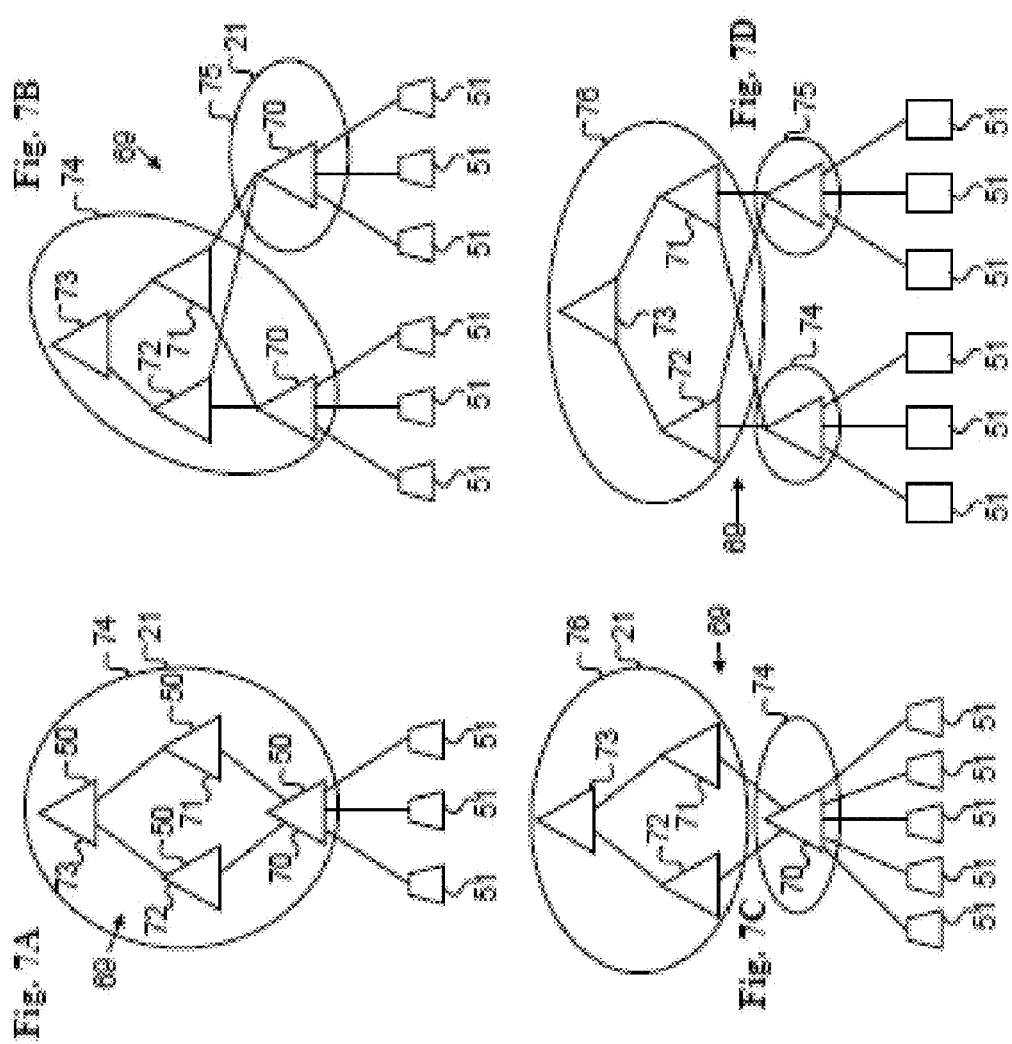
FIGS. 7A-7D are simplified block diagrams of four deployment plans of a service, in accordance with one embodiment.

FIG. 7A shows service 69 installed and operative on a single hardware unit 21 designated by numeral 74. In the example of FIG. 7A, hardware unit 21 is a processing board.

FIG. 7B shows service 69 having additional terminals 51 thus increasing the processing load on VNF instance 72, beyond the processing power available from hardware unit 21. To free some processing power, the chain optimization module plans an alternative deployment of VNF instances 70-73. VNF instance 70 is duplicated with one of the VNF instances installed in and executed by another, additional, hardware unit 21 designated by numeral 75. It is noted that VNF instances 71-73 defined as a cluster are kept together on the same hardware unit 21. FIG. 7B is an example of a redeployment that increases the sub-network breadth.

FIG. 7C shows service 69 having additional terminals 51 thus increasing the processing load on VNF instance 72, beyond the processing power available from hardware unit 21. In the example of FIG. 7C, the chain optimization module decides to migrate VNF instance 72 to another, additional, hardware unit 21 designated by numeral 76. As VNF instance 72 is part of a cluster, the entire cluster is migrated to hardware unit 76. Again, VNF instances 71-73 defined as a cluster are kept together on the same hardware unit 21. FIG. 7C is an example of a redeployment that pushes the sub-network into the network.

FIG. 7D shows a redeployment of service 69 increasing both the breadth and the depth of the sub-network of service 69 by adding to the deployment plan both hardware units 75 and 76. Again, VNF instances 71-73 defined as a cluster are kept together on the same hardware unit 21.

Figure 8:
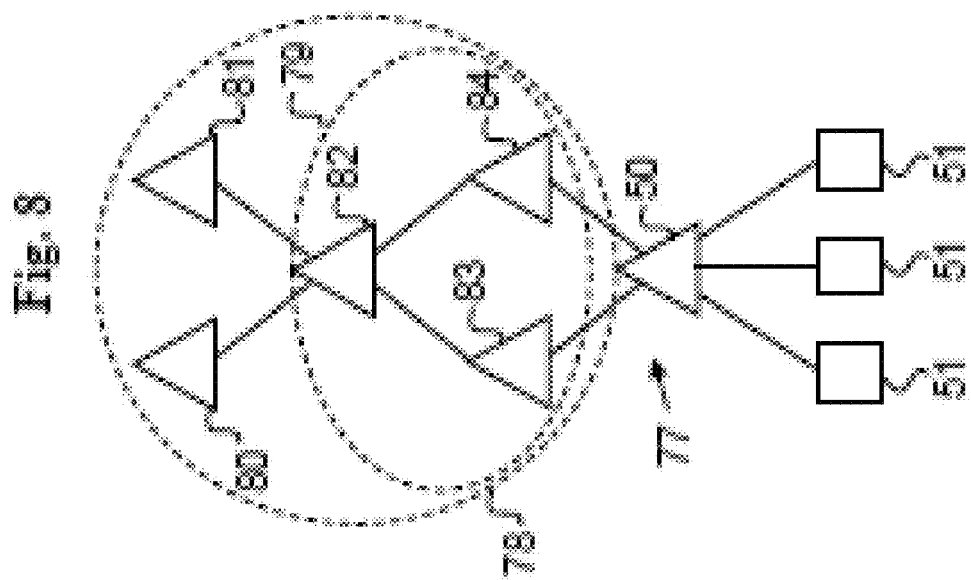
FIG. 8 is a simplified block diagram of a service including two overlapping clusters, in accordance with one embodiment.

Reference is now made to FIG. 8, which is a simplified block diagram of a service 77 including two overlapping clusters 78 and 79, according to one embodiment.

As seen in FIG. 8, VNF instances 50 designated by numerals 81-84 are defined as a cluster 78 that, for example, is restricted to the same rack. This means that, for example for reasons of communication bandwidth latency, or jitter, VNF instances 80-84 must therefore migrate together from rack to rack (but not necessarily to the same processing board with the rack). For similar or other reasons, VNF instances 82-84 are also defined as a cluster (79), which, for example, is restricted to the same processing board. Therefore, when the chain optimization module plans the deployment of service 77, or optimizes the deployment, or searches for a solution to a load increase or decrease, the chain optimization module should consider the requirements of both, or interdependencies between, clusters 78 and 79.

For example, the migration of VNF instance 80 is restricted to the rack hosting VNF instance 81 and cluster 78. If VNF instance 82 should be migrated to another board VNF instances 83 and 84 should also be migrated to the same board and the new board should be located in the same rack with VNF instances 80-81. Alternatively, VNF instances 80-81 should be migrated too, to the rack hosting the new board.

It is appreciated that when the chain optimization module plans or optimizes a service deployment plan, the chain optimization module considers the requirements and interdependencies of the VNF instances 50 constructing the service. Some of these VNF instances may be combined in clusters so that the chain optimization module considers the requirements and interdependencies of such clusters (together with independent VNF instances 50). Furthermore, some clusters may be completely or partially overlapping, where, for example, two or more clusters have one or more VNF instances in common. A cluster may be included within another cluster as in the case of cluster 79 included within cluster 78. Clusters may be partially overlapping when, for example, both clusters have at least one VNF instance not included in the other cluster.

When the chain optimization module considers clusters it considers the requirements defined for the cluster as a deployable entity. Therefore, clustering VNF instances reduces the number of requirements that the chain optimization module considers. As described above, the requirements of a cluster may be defined in terms of hardware type. For example, a particular type of processing board (or better), a particular type of processing rack (or better), a CMS, etc. This further simplifies the algorithm, or optimization method, used by the chain optimization module.

Service deployment optimization is typically performed by a leaf VNF-O directly responsible for the territory (group of processing units) hosting the service. If the leaf VNF-O is incapable of satisfying the increased load within its territory the service deployment optimization is moved to the parent (next highest) NFV-O supervising the leaf VNF-O. If the parent NFV-O has sufficient resources within its territory it may perform the service deployment optimization or allocate necessary processing units to the leaf NFV-O. The latter option is preferred for example when the leaf NFV-O is responsible for the service or for the customer using the service.

The chain optimization module uses a cost function to optimize the deployment of a service, and/or to evaluate or compare two or more deployment plans. The cost function calculates the cost of providing the service, the cost of failing to provide the service, and he cost of redeployment of the service. The process of calculating an optimized deployment of VNF instances may use any number of cost function, or a cost function applied to a plurality of related, or unrelated, services, or a combination thereof. The cost functions calculates the following cost parameters: load parameters (processing power, memory, storage, traffic (bandwidth), latency, energy consumption and cooling requirements, average demand and peak demand, etc.); cost of available resources; and cost of incompatible service per SLA, etc.

For example, the direct cost of a resource such as storage, when in abundance, is low, and would increase as the resource is consumed and become scarce. However, the indirect cost of a resource such as storage, such as the cost of electricity and cooling, may be high if the resource is the sole consumer and not in use. This means that switching on a resource may have a higher indirect cost than the cost of the resource if already in use.

Figure 9:
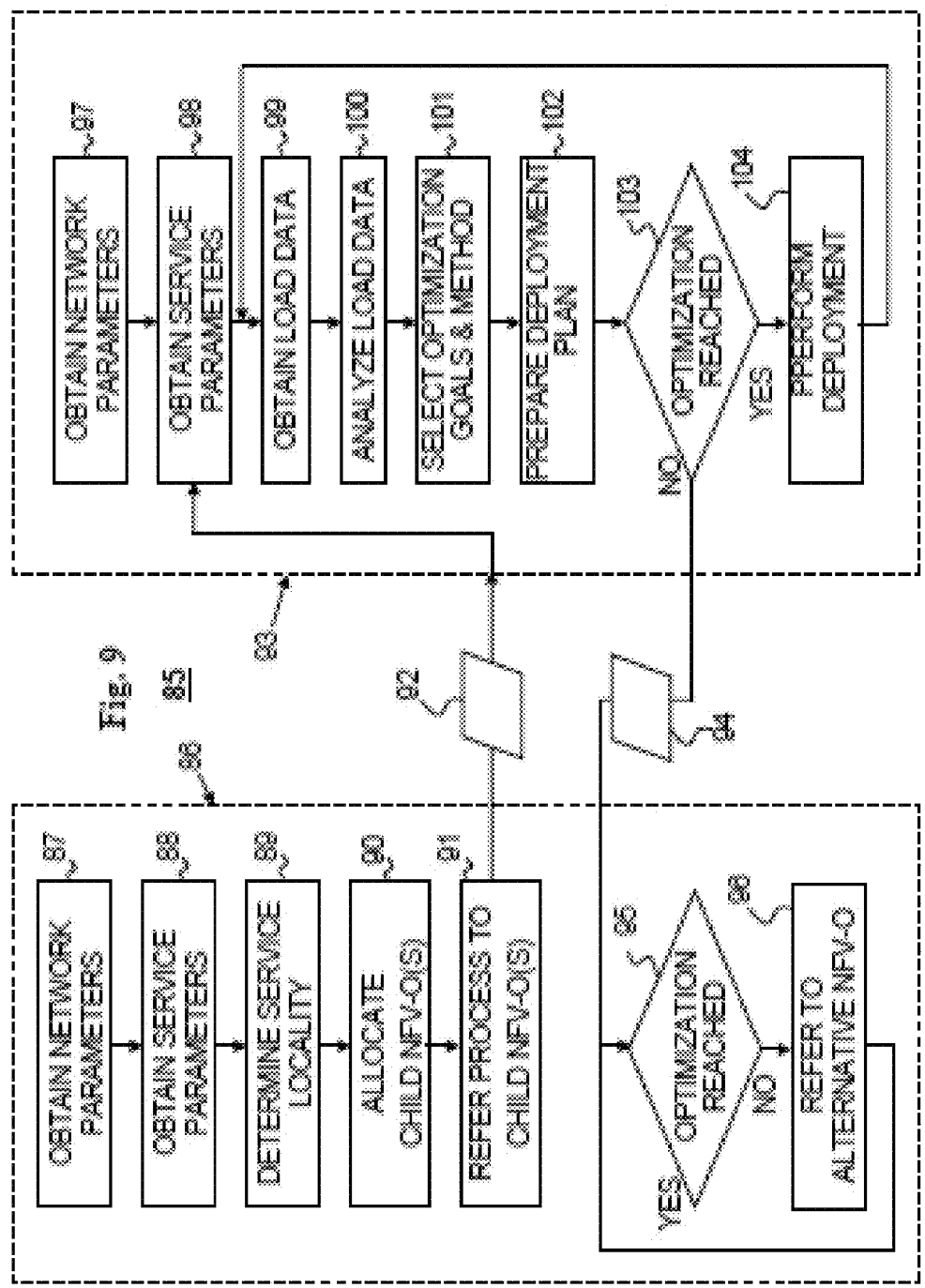
FIG. 9 is a simplified flow chart of a chain optimization procedure, in accordance with one embodiment.

Reference is now made to FIG. 9, which is a simplified flow chart of a chain optimization procedure 85, according to one embodiment.

The terms parent core component, parent NFV-O, and global NFV-Os may refer to the same type of entity. Similarly, child component leaf component, child NFV-O, subordinate NFV-O, and local NFV-Os may refer to the same type of entity. Each of these entities may include a chain optimization module. The chain optimization procedure 85 can be processed by one or more of such entities, as well as their respective chain optimization module, as deemed relevant according to the topology or configuration of the service, according to the topology or configuration of the network, and according to the topology or configuration of the NFV-O hierarchy.

Chain optimization procedure 85 is an example of a process executed by the chain optimization module for planning (and optionally implementing) initial deployment of a service, or for optimizing an existing deployment of a service (and optionally implementing redeployment). The chain optimization procedure 85 may be executed by one or more NFV-Os, and consequently by one or more chain optimization modules. If a network is managed by two or more core components or leaf components (NFV-O instances and a corresponding chain optimization module) then some of the steps described herein may be executed by different core components or leaf components, or repeated by other core components or leaf components.

Chain optimization procedure 85 typically starts with sub-process 86 executed by a global NFV-O, such as a root (top level) or a parent core component. The global NFV-O, executing the chain optimization module, and performing chain optimization procedure 85, typically starts with step 87 by obtaining network parameters. Network parameters here refer to the deployment of the hardware infrastructure as presented above with regard to hardware units and communication links (transmission lines), for example, of FIG. 5. Network parameters may also include the current deployment of VNFs and VNF instances, as well as the current requirements for these VNF instances and the current loads on hardware units and communication links. For example, network parameters may be obtained from an assurance module or service management module.

Chain optimization procedure 85 typically proceeds to step 88 by obtaining service parameters. In this respect, service parameters include a list of VNFs associated with the particular service and a list of requirements for each of these VNFs. The requirements refer to parameters such as maximum, minimum, and/or average values for processing load, memory, storage, bandwidth, latency, jitter, etc. Service parameters are typically obtained from a catalog module.

Chain optimization procedure 85 typically proceeds to step 89 to determine the network locality in which the service should be deployed. Network locality refers to a particular group of hardware units. Typically, the network locality is managed by one or more child core components or leaf components. The global NFV-O executing sub-process 86 of chain optimization procedure 85 therefore proceeds to step 90 to determine the local NFV-Os that should continue with chain optimization procedure 85. If necessary, the global NFV-O allocates (e.g. initiates or instantiates) one or more local NFV-Os. The global NFV-Os then sends (step 91) a command 92 to the respective local NFV-Os to continue chain optimization procedure 85. Command 92 typically includes the service parameters obtained in step 88. Chain optimization procedure 85 then typically proceeds to sub-process 93, which is typically executed by one or more local NFV-Os.

When chain optimization procedure 85 is completed sub-process 93 sends a command 94 to sub-process 86 indicating the success or failure of a particular sub-process 93. It is noted that there may be a plurality of sub-processes 93 (executed by a respective plurality of local NFV-Os) and that one or more of these sub-processes 93 may fail. If a sub-process 93 fails (step 95), sub-process 86 may proceed to step 96 to refer the deployment of the particular component of the service to another local NFV-Os (another child core components or leaf components) or refer the deployment of the service to a higher level of the NFV-O hierarchy, such as a parent NFV-O).

It is appreciated that the global NFV-Os may be a parent core component supervising a large geographical territory in which several child core components or leaf components manage their respective localities. Alternatively, the global NFV-Os may be supervising all services provided to a particular customer. Alternatively, the global NFV-Os may be supervising a particular service type (provided to a plurality of customers (optionally irrespectively of the customer or service locality). It is appreciated that chain optimization procedure 85 may be executed entirely by a single NFV-O.

It is also appreciated that when a global NFV-O sends a plurality of commands 92 to a respective plurality of local NFV-O, each of the commands 92 may include or indicate a different sub-set of the service elements (such as VNFs and their VNF instances) and their respective service parameters.

Returning to sub-process 93, the chain optimization procedure 85 proceeds to step 97 where the local NFV-O obtains network parameters for the network locality it supervises. For example, network parameters may be obtained from assurance module or service management module.

As described above with reference to the NFV-O hierarchy and FIG. 6, sub-process 86 may determine child NFV-Os (steps 89-90) according to performance requirements and load values applied to whole child NFV-Os under the supervision of the core components executing sub-process 86. Sub-process 93 therefore obtains network parameters relevant to its territory and at the appropriate granularity or resolution.

It is appreciated that while chain optimization procedure 85 of FIG. 9 includes a two-level hierarchy (sub-process 86 being the higher level and sub-process 93 being the lower level), it can be implemented in any number of levels, including a single level or more than two levels. In the case the two-level hierarchy of chain optimization procedure 85 as described in FIG. 9 the lower level sub-process 93 deals with basic hardware and software elements and their respective performance requirements and load values.

Sub-process 93 proceeds to step 98 where the local NFV-O obtains service parameters relevant to its territory. Typically, these service parameters are provided by sub-process 86 in command 92. Sub-process 93 then proceeds to step 99 to obtain current load data.

Load data is typically obtained according to rules. Load collection rules indicates how and when to collect load data from hardware units and software modules of the NFV-based network. In step 99 Sub-process 93 typically loads operational parameters and load collection rules. Using these collection rules Sub-process 93 collects load values for hardware and software components of the NFV-based network. Sub-process 93 may collect load values continuously or repetitively providing updated load values.

Sub-process 93 then proceeds to step 100 to analyze the load data. Load data is typically analyzed according to rules. Step 100 typically loads the analysis rules and executed them to analyze the load values collected by step 99. For example, step 100 computes and compares absolute or relative (percentage) load values and orders their respective hardware and/or software (VNF) instances according to these values. For example, step 100 computes and compares the changes in the absolute or relative (percentage) load values per a unit of time and orders their respective hardware and/or software (VNF) instances according to these values. For example, step 100 anticipates and computes changes in the absolute or relative (percentage) load values for a predetermined point in time in the future, and orders their respective hardware and/or software (VNF) instances according to these values.

In this respect, step 100 may compare any of these values with respective predefined thresholds, and then order their respective hardware and/or software (VNF) instances according to these comparisons. It is appreciated that for example, step 100 may be executed continuously or repetitively providing updated load analysis values.

Sub-process 93 then proceeds to step 101 to select optimization one or more goals and methods (such as an optimization algorithm).

In step 101 process 93 may determine and prioritize optimization goals. Optimization goals may be, for example, reducing a maximum value, achieving a balance, and/or reducing local jitter.

The term "balance" typically refer to achieving similar load value among a group of hardware and/or software network components. Balancing goals may be, for example: to balance traffic loads (bitrate, latency, jitter, etc.) according to current relative load values (percentage of local maxima); to balance processing loads according to anticipated load values, or to balance memory loads according to their respective thresholds; and to reduce cost, for example by saving energy, for example by turning off least active computing facilities.

Reducing jitter in this respect may refer to minimizing load changes over time by, for example, removing correlated load changes from the same hardware and/or software network components.

Optimization goals may also use safety ranges, for example relating to SLA, where the goal is to keep a particular load value within the safety range of a maximum value. Optimization goals may be prioritized to enable optimization according to more than one goal, and to resolve trade-offs between different optimization plans.

In step 101 process 93 may also select one or more optimization methods, such as moving load up the hierarchy, or down the hierarchy, to a less loaded computing facility, or splitting a load between two or more processing facilities, or evacuating load from a particular computing facility to enable shutdown.

Sub-process 93 proceeds to step 102 to employ the optimization method, network parameters, service parameters, and load data to prepare a deployment plan for the service components as indicated in command 92.

If a deployment optimization plan is reached (step 103), sub-process 93 proceeds to step 104 to implement the deployment optimization plan. The implementation of the deployment optimization plan can be performed by sub-process 93, or by sub-process 86, or by another module of chain optimization procedure 85, or the chain optimization module. Alternatively sub-process 93 may communicate the deployment optimization plan to another module, such as a service fulfillment module of the appropriate NFV-O.

As described above, if a deployment optimization plan is not reached, sub-process 93 sends command 94 to sub-process 86.

Figure 10:
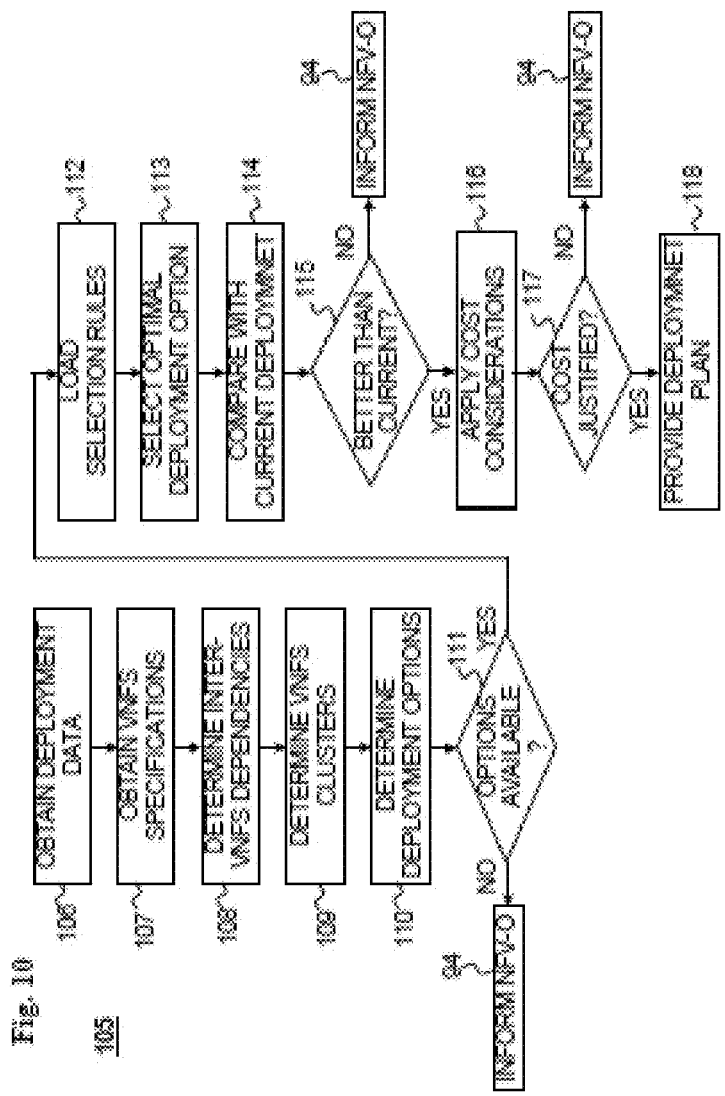
FIG. 10 is a simplified flow chart of a deployment planning module, in accordance with one embodiment.

Reference is now made to FIG. 10, which is a simplified flow chart of a deployment planning module 105, according to one embodiment. Deployment planning module 105 is an example of a module implementing step 102 of FIG. 9.

Deployment planning module 105 typically starts by obtaining deployment data (step 106). Deployment data here typically refers to network parameters, service parameters (specifications), load values, etc. deployment data is typically obtained from the module calling (executing, referring to, etc.) the deployment planning module 105.

Deployment planning module 105 proceeds to step 107 to determine the VNFs making the service, and specifications of the associated VNF instances. In the following step 108 deployment planning module 105 determines interdependencies between relevant VNF instances of the particular service. The term interdependencies refer to requirement and/or specifications that any VNF instance imposes on any another VNF instance. For example, in terms of bandwidth, latency, jitter, etc. Such interdependencies may affect the relative location of particular pairs or groups of VNF instances. For example, interdependencies may require that a pair or a group of VNF instances should reside in the same CMS, same rack, the same processing board, etc. Deployment planning module 105 then proceeds to step 109 to determine clusters of VNF instances. Clustering here refers to the colocation of VNF instances in terms of CMSs, racks, processing boards, etc.

Deployment planning module 105 then proceeds to step 110 to determine one or more optional configurations or topologies of the VNF instances making the particular service. If no such options are available (step 111) deployment planning module 105 sends command 94 as described in the context of FIG. 9.

If a deployment option is available, deployment planning module 105 proceeds to step 112 to load option selection rules and to select an optimal deployment option in step 113 (if two or more deployment options are available) and/or (if only one deployment option is available) to step 114 to compare the preferred deployment option with the current deployment (if the service is already deployed).

If the service is already deployed and a new deployment option is determined to be preferred (step 115), the deployment planning module 105 proceeds to step 116 to determine if redeployment is justified considering the cost of the redeployment. If the redeployment is justified (step 117) the preferred deployment plan is provided (step 118) to the module calling (executing, referring to) deployment planning module 105 (such as sub-process 93).

Figure 11:
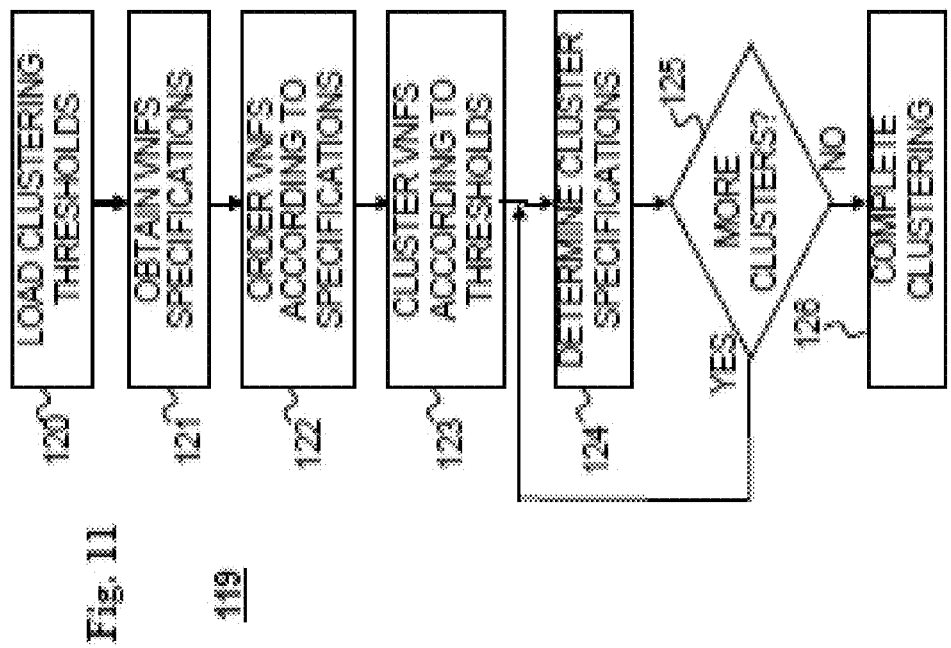
FIG. 11 is a simplified flow chart of a clustering module, in accordance with one embodiment.

Reference is now made to FIG. 11, which is a simplified flow chart of a clustering module 119, according to one embodiment. Clustering module 119 is an example of a module implementing step 109 of FIG. 10.

Clustering module 119 typically starts in step 120 by loading clustering thresholds. Clustering thresholds are typically values of performance related parameters such as processing power, memory size, storage capacity, communication bandwidth, latency, and jitter, etc. Clustering thresholds typically represent the values which particular hardware or processing elements may provide. For example, the value of the bandwidth available between two particular processing modules. Clustering module 119 then proceeds to step 121 to obtain VNF specifications for the relevant VNF instances. Clustering thresholds and VNF specifications are typically provided to clustering module 119 by the calling module, such as the deployment planning module 105.

Clustering module 119 then proceeds to step 122 to order the VNF instances according to their connectivity (which VNF instance is connected or communicating with which other VNF instances) and their specifications (e.g. their requirements from the other VNF instances). Clustering module 119 then clusters the VNF instance according to the available thresholds (step 123).

Clustering module 119 then proceeds to steps 124 and 125 to determine the specifications of each cluster. When all clusters are completed clustering module 119 reports the clusters structures and specification (step 126) to the calling module, such as the deployment planning module 105.

Figure 12:
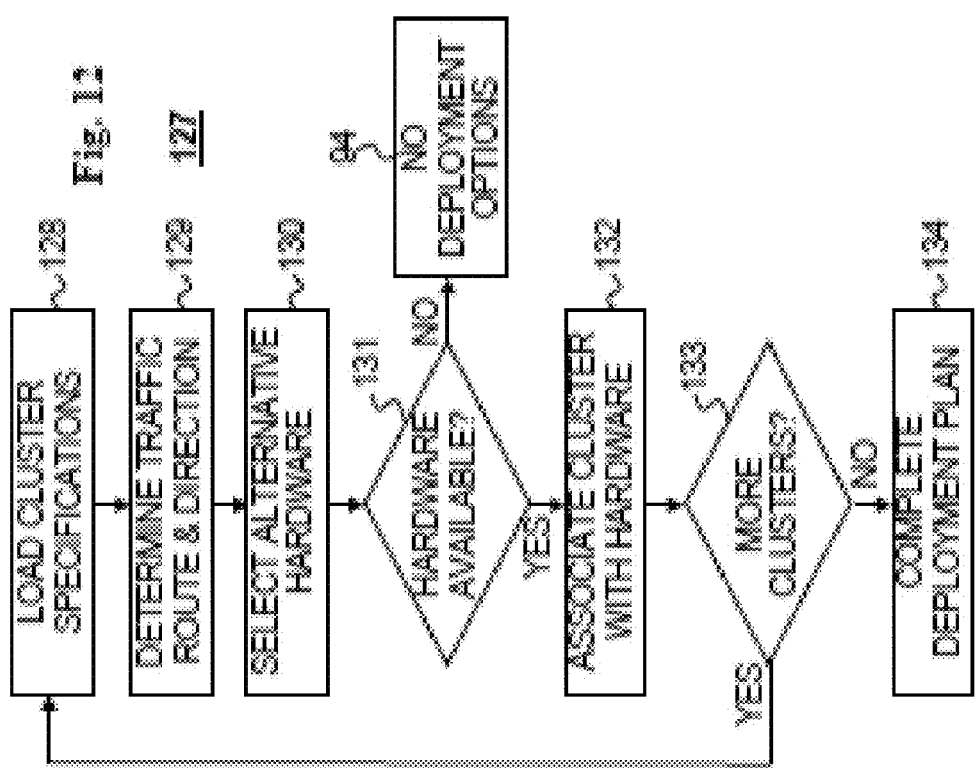
FIG. 12 is a simplified flow chart of a cluster deployment planning module, in accordance with one embodiment.

Reference is now made to FIG. 12, which is a simplified flow chart of a cluster deployment planning module 127 according to one embodiment. Cluster deployment planning module 127 is an example of a module implementing step 110 of FIG. 10.

Cluster deployment planning module 127 typically starts in step 128 by loading cluster specifications, which are typically provided by the calling module, such as deployment planning module 105. Cluster deployment planning module 127 typically proceeds to step 129 to determine traffic routs, directions and loads for the cluster and then to step 130 to select hardware elements and/or processing-related units (such as processors, processing boards, racks, etc.) that are available to provide the cluster requirements. If (step 131) an appropriate hardware element is available the cluster is associated (step 132) with the hardware element (or processing-related unit). Otherwise the process fails, sending command 94.

Steps 128-132 are repeated until all clusters are located in and/or associated with appropriate hardware elements (step 133), or until any of one or more clusters have no hardware available for deployment, or otherwise have no deployment options.

If a cluster deployment plan is completed it is provided to the calling module (step 134), such as deployment planning module 105. If cluster deployment planning module 127 fails an appropriate command is provided to the calling module.

It is appreciated that a cluster deployment plan is later used to deploy the related chain of VNF instances, including the related clusters, as well as VNF instances that are part of the VNF chain and not members of any cluster. The term "deployment" here refers to actions such as installing the VNF chain and/or its components (e.g. VNFs, VNF instances, clusters, sub-clusters, un-clustered VNFs and/or VNF instances, etc.), initiating the VNF chain and/or any of its components, operating or executing the VNF chain and/or any of its components, migrating the VNF chain and/or any of its components, etc. Therefore, associating a cluster and/or a VNF and/or a VNF instance with a hardware element eventually evolves into a deployment, installation, initialization, operating, executing, and/or migrating the cluster, VNF and/or VNF instance in (or into) the hardware element.

Figure 13:
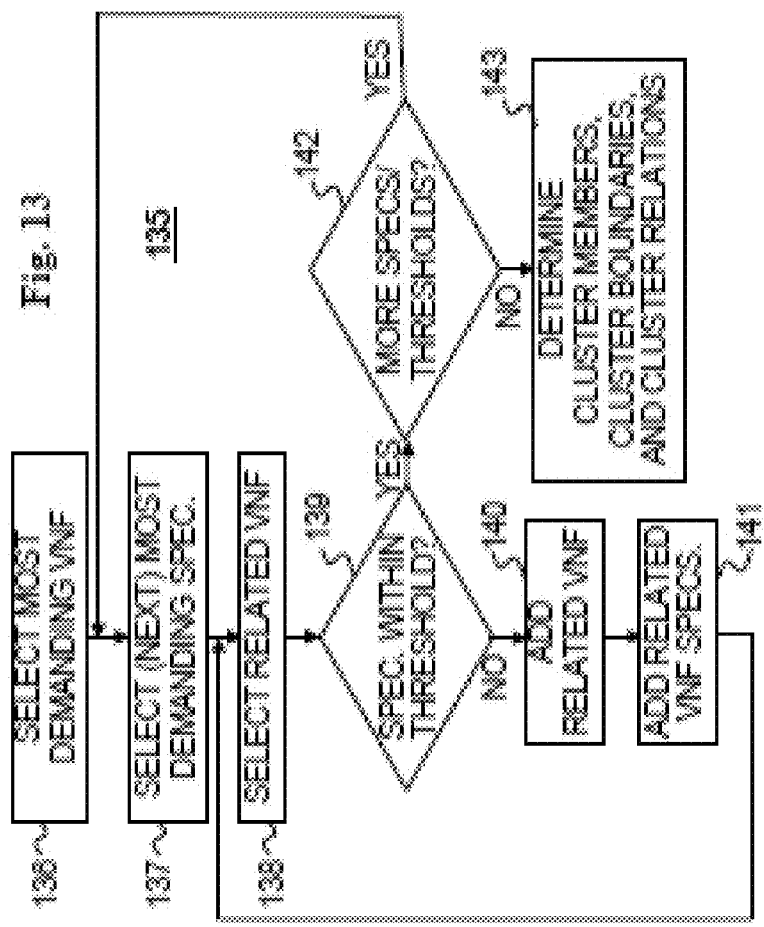
FIG. 13 is a simplified flow chart of a cluster configuration process, in accordance with one embodiment.

Reference is now made to FIG. 13, which is a simplified flow chart of a cluster configuration process 135 according to one embodiment. Cluster configuration process 135 is an example of a process (or a module) implementing step 123 of FIG. 11.

As shown in FIG. 13, cluster configuration process 135 starts with step 136 by selecting the VNF instance having the most stringent requirements. This VNF instance is typically selected from the top of the ordered list prepared in step 122 of process 119 of clustering module, as shown and described with reference to FIG. 11.

Cluster configuration process 135 proceeds to step 137 by selecting the most demanding requirement (or specification) of the selected VNF instance. The most demanding VNF instance is listed first, typically because it has the most demanding specification (requirement). The requirement here refers to a particular interdependency, typically relating to another VNF instance. For example, such requirement may be the shortest latency. Such requirement may require, for example, that both VNF instances reside within the same hardware unit (processor, board, rack, DC, etc.).

Cluster configuration process 135 proceeds to step 138 by selecting the VNF instance associated with the selected most demanding specification. The process now considers particular type of specification (for example, latency) for the cluster including these two VNF instances. Namely, the value of the specification of the particular type (e.g. latency) regarding the interdependency of the cluster with respect to any other VNF instance.

If (step 139) the cluster interdependency is still beyond the particular threshold than cluster configuration process 135 adds the next VNF instances to the cluster (step 140). The next VNF instances is typically determined as the VNF instances with which the group has an interdependency beyond the threshold as specified for the requirement under consideration in step 137. Cluster configuration process 135 then adds (step 141) the specification of the added VNF instances with respect to VNF instances outside the cluster, to the cluster (boundary) specifications.

Cluster configuration process 135 then repeats steps 138 through 141, adding VNF instances to the cluster, until the cluster's boundary specification is within the specified threshold.

It is appreciated that the term "beyond" a threshold may refer to a value being either greater than the threshold or less than the threshold. The term "beyond" a threshold indicates that the requirement is stringent, such as to require that VNF instances sharing the requirement being "beyond a threshold" reside, for example, in the same hardware unit (e.g. same processor, same, board, same rack, same DC, etc.) or otherwise have some kind of privileged or prioritized relation (e.g. shared memory, shared high-speed storage, high QoS transmission, etc.). The term "within threshold" refers to a condition or situation not requiring same hardware, privileged relation, etc.

If the particular specification is within the threshold cluster configuration process 135 proceeds to step 142 to determine if there are other specifications (requirements) of the cluster not yet checked. If needed, cluster configuration process 135 repeats steps 137 through 141, adding VNF instances to the cluster, until all the specifications are within their respective thresholds. This process may also add cluster boundary specifications and their respective thresholds.

When all the cluster specifications are within their respective thresholds cluster configuration process 135 proceeds to step 143 to determine the cluster's members (e.g. VNF instances), the cluster boundaries, the cluster interdependencies, the cluster specifications (interdependency requirements) and their respective thresholds.

Figure 14:
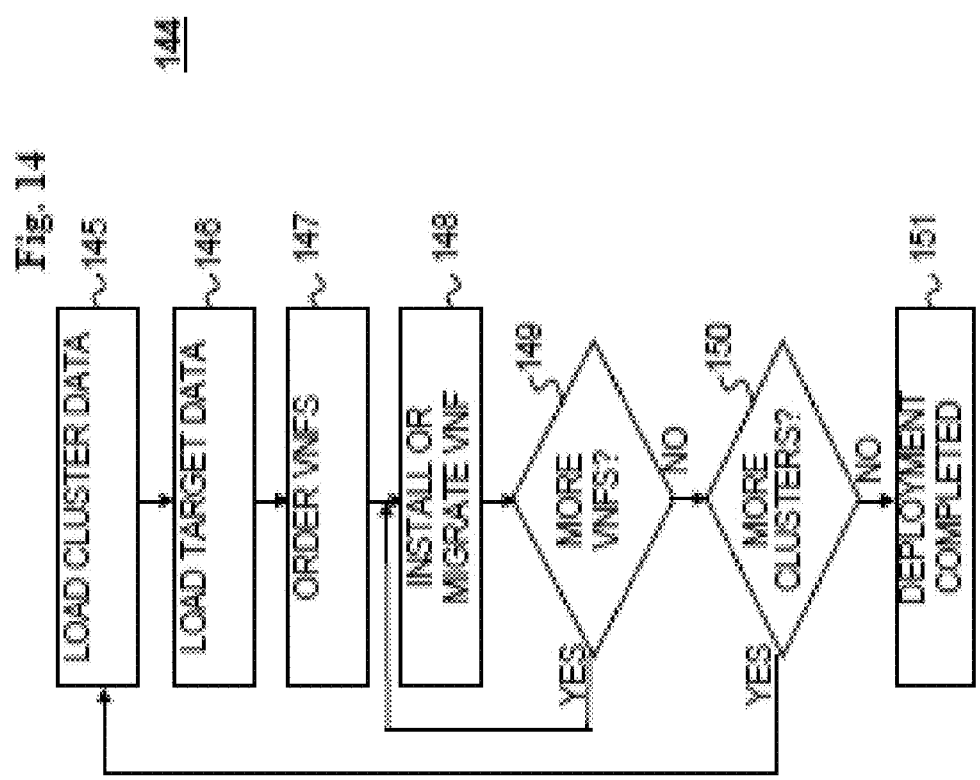
FIGS. 14 and 15, taken together, are a simplified flow chart of a deployment implementation module, in accordance with one embodiment.
Figure 15:
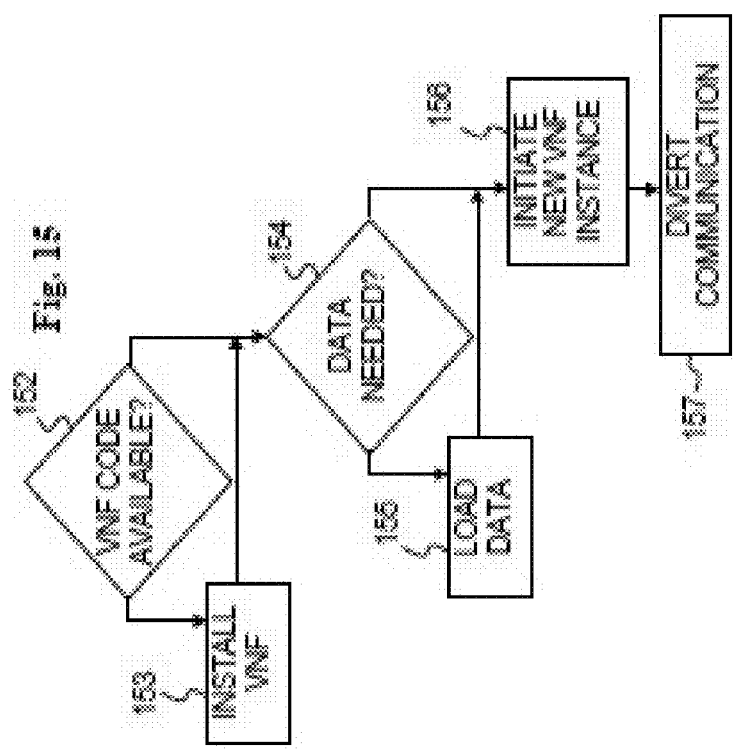

Reference is now made to FIGS. 14-15, which, taken together, are a simplified flow chart of a deployment implementation module 144, according to one embodiment. Deployment implementation module 144 is an example of a module implementing step 104 of FIG. 9.

Deployment implementation module 144 typically starts by loading cluster data (step 145), and target data (step 146), typically provided by the calling module. The calling module may be chain optimization procedure 85 of FIG. 9 or another module of an NFV-O, such as a service fulfillment module. Target data here refers to the hardware elements in which the cluster should be installed, or to which the cluster should be migrated. Deployment implementation module 144 then orders the VNF instances (step 147) according to order by which they have to be installed, operated, and/or migrated. Deployment implementation module 144 then performs steps 148 and 149 to install or migrate all the VNFs and VNF instances. Steps 145-149 are repeated until (step 150) all the clusters are deployed and the calling module is updated (step 151).

FIG. 15 is an example of an implementation of step 148 in which a VNF instance is installed (if necessary) and initiated and/or migrated. In step 152 Deployment implementation module 144 determines if a VNF is already available (installed) in the target hardware, and if the code in not available Deployment implementation module 144 installs the VNF (step 153). In step 154 Deployment implementation module 144 determines if the VNF requires data (or data update) and if data is required loads the data to the VNF (step 155). Deployment implementation module 144 then initiates the VNF and a new VNF instance (step 156), and, if needed, diverts communication from other VNF instances to the new VNF instance (step 157).

More information regarding possible processes for migrating one or more VNF instance may be found in U.S. Provisional Patent Application No. 61/918,597, titled "System, Method, And Computer Program For Preserving Service Continuity In A Network Function Virtualization (NFV) Based Communication Network", and U.S. patent application Ser. No. 14/572,716, now U.S. Pat. No. 9,384,028, titled "System, Method, And Computer Program For Preserving Service Continuity In A Network Function Virtualization (NFV) Based Communication Network", which are incorporated by reference herein in their entirety. For example, in one embodiment, step 148 of FIG. 14 may be performed utilizing the techniques described in one or more of these applications.

It is appreciated that FIGS. 11 and 12 of U.S. patent application Ser. No. 14/572,716, now U.S. Pat. No. 9,384,028, titled "System, Method, And Computer Program For Preserving Service Continuity In A Network Function Virtualization (NFV) Based Communication Network", as well as their respective description may be used instead of, or in addition to, FIG. 15 herein.

Figure 16:
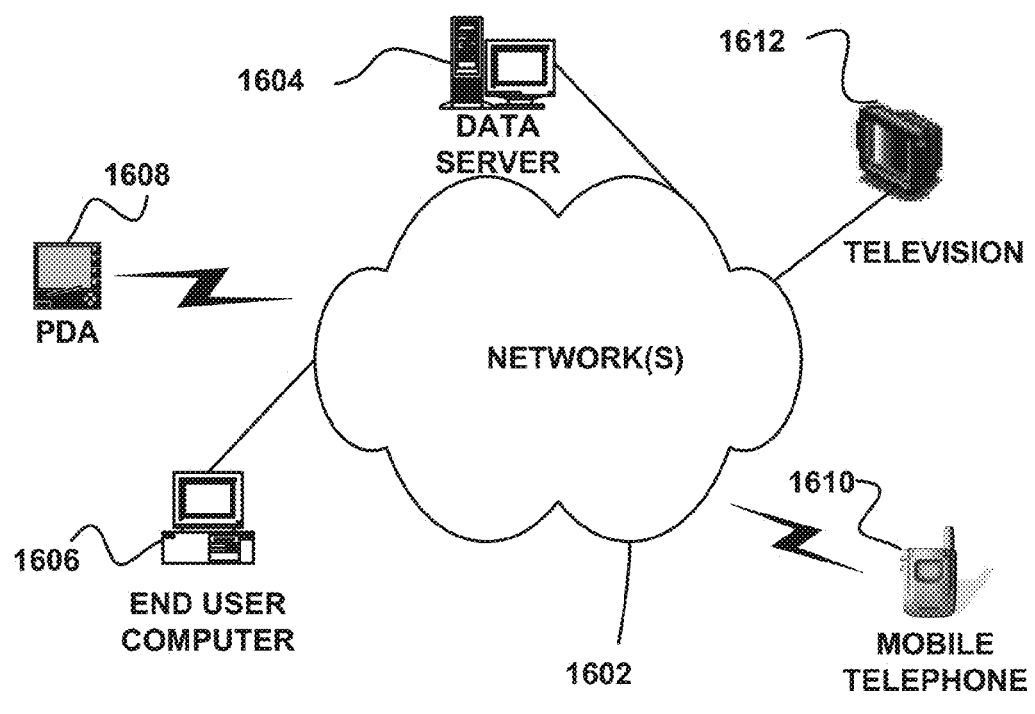
FIG. 16 illustrates a network architecture, in accordance with one possible embodiment.

FIG. 16 illustrates a network architecture 1600, in accordance with one possible embodiment. As shown, at least one network 1602 is provided. In the context of the present network architecture 1600, the network 1602 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 1602 may be provided.

Coupled to the network 1602 is a plurality of devices. For example, a server computer 1604 and an end user computer 1606 may be coupled to the network 1602 for communication purposes. Such end user computer 1606 may include a desktop computer, lap-top computer, and/or any other type of logic. Still yet, various other devices may be coupled to the network 1602 including a personal digital assistant (PDA) device 1608, a mobile phone device 1610, a television 1612, etc.

Figure 17:
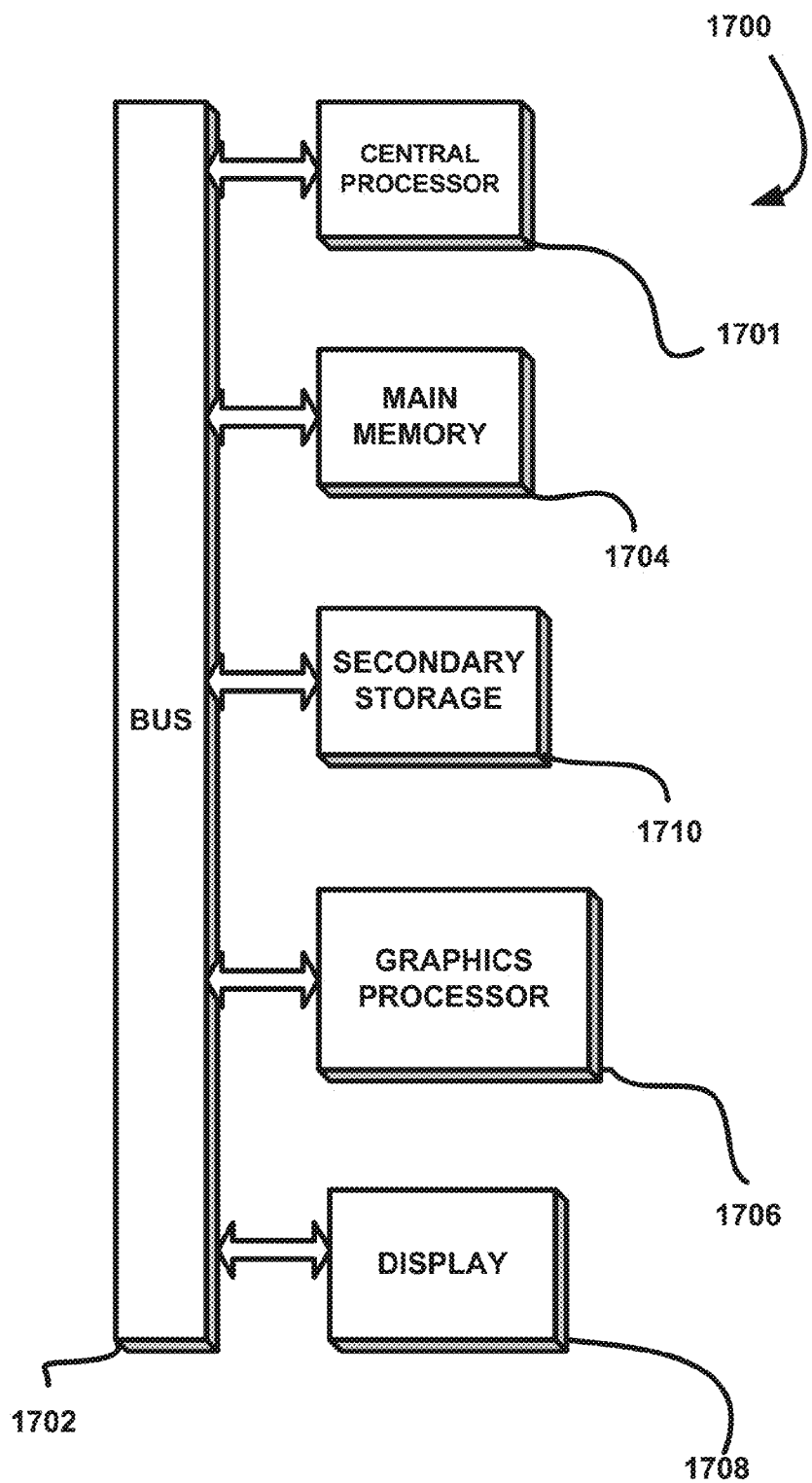
FIG. 17 illustrates an exemplary system, in accordance with one embodiment.

FIG. 17 illustrates an exemplary system 1700, in accordance with one embodiment. As an option, the system 1700 may be implemented in the context of any of the devices of the network architecture 1600 of FIG. 16. Of course, the system 1700 may be implemented in any desired environment.

As shown, a system 1700 is provided including at least one central processor 1701 which is connected to a communication bus 1702. The system 1700 also includes main memory 1704 [e.g. random access memory (RAM), etc.]. The system 1700 also includes a graphics processor 1706 and a display 1708.

The system 1700 may also include a secondary storage 1710. The secondary storage 1710 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 1704, the secondary storage 1710, and/or any other memory, for that matter. Such computer programs, when executed, enable the system 1700 to perform various functions (as set forth above, for example). Memory 1704, storage 1710 and/or any other storage are possible examples of tangible computer-readable media.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   identifying, by a computer processor, a service to be provisioned in a Network Function Virtualization based (NFV-based) communication network comprising a plurality of computing-related units and communication links in-between, the service to be provisioned as a chain of virtual network function (VNF) instances;
   determining, by the computer processor, at least one first performance requirement independently configured for each of the VNF instances;
   determining, by the computer processor, at least one second performance requirement configured for the chain of VNF instances;
   selecting, by the computer processor, a portion of the NFV-based communication network in which to deploy the service, based on performance characteristics of the portion of the NFV-based communication network satisfying the at least one first performance requirement and the at least one second performance requirement, the portion of the NFV-based communication network having one or more of:
      at least one computing-related unit of the plurality of computing-related units, and
      at least one communication link of the communication links; and
   deploying the service using the selected portion of the NFV-based communication network.

2. The method of claim 1, wherein the at least one first performance requirement independently configured for each of the VNF instances includes at least one of:
   hardware resource requirements,
   quality of service requirements, and
   operational requirements.

3. The method of claim 2, wherein:
   the hardware resource requirements include at least one of: a processing power requirement, a cache memory capacity requirement, a non-volatile memory capacity requirement, and a cooling requirement, and
   the quality of service requirements include at least one of: maximum latency or delay, average latency and maximum variance (latency jitter), and maximum allowed packet loss, and
   the operational requirements include at least one of service availability, redundancy, backup, provisions for roll-back and/or recovery, fault-tolerance, and fail-safe operation.

4. The method of claim 1, wherein the at least one second performance requirement configured for the chain of VNF instances includes requirements for communications links between the VNF instances in the chain, the requirements for the communications links include at least one of: bandwidth, latency, bit-error rate, and packet loss.

5. The method of claim 1, wherein the at least one second performance requirement configured for the chain of VNF instances includes requirements for deployment of the VNF instances in the chain, including at least one of: requiring specified ones of the VNF instances in the chain to reside in a same data-center, within a same rack, or in a same computing device sharing memory or being executed by a same processor.

6. The method of claim 1, wherein the service is initially deployed to a different portion of the NFV-based communication network, and wherein the method is performed as an optimization process that migrates the service to the selected portion of the NFV-based communication network.

7. The method of claim 6, wherein the optimization process is performed when the different portion of the NFV-based communication network is over-loaded or approaches an overload situation.

8. A computer program product embodied on a non-transitory computer readable medium, including computer code executed by a computer processor to perform a method comprising:
   identifying, by the computer processor, a service to be provisioned in a Network Function Virtualization based (NFV-based) communication network comprising a plurality of computing-related units and communication links in-between, the service to be provisioned as a chain of virtual network function (VNF) instances;
   determining, by the computer processor, at least one first performance requirement independently configured for each of the VNF instances;
   determining, by the computer processor, at least one second performance requirement configured for the chain of VNF instances;
   selecting, by the computer processor, a portion of the NFV-based communication network in which to deploy the service, based on performance characteristics of the portion of the NFV-based communication network satisfying the at least one first performance requirement and the at least one second performance requirement, the portion of the NFV-based communication network having one or more of:
      at least one computing-related unit of the plurality of computing-related units, and
      at least one communication link of the communication links; and
   deploying the service using the selected portion of the NFV-based communication network.

9. A system, the system comprising:
   a memory system; and
   one or more processing cores coupled to the memory system and that are each configured to:
   identify a service to be provisioned in a Network Function Virtualization based (NFV-based) communication network comprising a plurality of computing-related units and communication links in-between, the service to be provisioned as a chain of virtual network function (VNF) instances;
   determine at least one first performance requirement independently configured for each of the VNF instances;
   determine at least one second performance requirement configured for the chain of VNF instances;

select a portion of the NFV-based communication network in which to deploy the service, based on performance characteristics of the portion of the NFV-based communication network satisfying the at least one first performance requirement and the at least one second performance requirement, the portion of the NFV-based communication network having one or more of:
at least one computing-related unit of the plurality of computing-related units, and
at least one communication link of the communication links; and
deploy the service using the selected portion of the NFV-based communication network.

* * * * *